United States Patent
Holladay et al.

(10) Patent No.: US 7,208,136 B2
(45) Date of Patent: Apr. 24, 2007

(54) ALCOHOL STEAM REFORMING CATALYSTS AND METHODS OF ALCOHOL STEAM REFORMING

(75) Inventors: Jamelyn D. Holladay, Kennewick, WA (US); Yong Wang, Richland, WA (US); Jianli Hu, Kennewick, WA (US); Ya-Huei Chin, Richland, WA (US); Robert A. Dagle, Richland, WA (US); Guanguang Xia, Pasco, WA (US); Eddie G. Baker, Pasco, WA (US); Daniel R. Palo, Kennewick, WA (US); Max R. Phelps, Richland, WA (US); Heon Jung, Taejon (KR)

(73) Assignee: Battelle Memorial Institute, Richland, WA (US)

( * ) Notice: Subject to any disclaimer, the term of this patent is extended or adjusted under 35 U.S.C. 154(b) by 89 days.

(21) Appl. No.: 10/440,448

(22) Filed: May 16, 2003

(65) Prior Publication Data

US 2007/0041893 A1    Feb. 22, 2007

(51) Int. Cl.
*C01B 3/26* (2006.01)
*B01J 23/60* (2006.01)
*B01J 23/44* (2006.01)
*B01J 23/42* (2006.01)
*B01J 23/00* (2006.01)

(52) U.S. Cl. .............. 423/652; 502/329; 502/333; 502/339; 502/342; 502/343

(58) Field of Classification Search .......... 502/342, 502/343, 345, 346, 355, 415, 439, 329, 333, 502/339; 252/373; 423/652
See application file for complete search history.

(56) References Cited

U.S. PATENT DOCUMENTS

| | | | |
|---|---|---|---|
| 3,823,088 A * | 7/1974 | Box, Jr. et al. ............. | 210/762 |
| 4,177,219 A | 12/1979 | Feinstein et al. ........... | 585/489 |
| 4,188,490 A * | 2/1980 | Hinnenkamp et al. ...... | 560/245 |
| 4,511,673 A | 4/1985 | Eto ............................. | 502/525 |
| 4,522,894 A | 6/1985 | Hwang et al. ................ | 429/17 |
| 4,596,782 A | 6/1986 | Courty et al. ............... | 502/302 |
| 4,613,584 A | 9/1986 | Schneider et al. .......... | 502/304 |
| 4,985,230 A | 1/1991 | Baden et al. ................ | 423/650 |
| 5,356,851 A * | 10/1994 | Sarrazin et al. ............. | 502/185 |
| 5,510,056 A | 4/1996 | Jacobs et al. ............... | 252/373 |

(Continued)

FOREIGN PATENT DOCUMENTS

EP    1061011    12/2000

(Continued)

OTHER PUBLICATIONS

Chin et al., "Steam reforming of methanol over highly active Pd/ZnO catalyst," Catal. Today 77 (2002) 79-88.

(Continued)

*Primary Examiner*—Cam N. Nguyen
(74) *Attorney, Agent, or Firm*—Frank Rosenberg; Vincent Brantom

(57) ABSTRACT

The present invention provides steam reforming catalyst compositions containing Pd and Zn, and methods of steam reforming alcohols over a catalyst. Surprisingly superior results and properties of the present invention, including low temperature activity and/or low carbon monoxide output, are also described. Methods of making a steam reforming catalyst are also provided.

27 Claims, 11 Drawing Sheets

U.S. PATENT DOCUMENTS

| | | | | |
|---|---|---|---|---|
| 5,639,401 | A | | 6/1997 | Jacobs et al. ............... 252/373 |
| 5,783,607 | A | * | 7/1998 | Chaumette et al. ......... 518/713 |
| 5,817,896 | A | * | 10/1998 | Thomson ................... 570/176 |
| 5,899,678 | A | * | 5/1999 | Thomson et al. .............. 431/2 |
| 6,051,163 | A | | 4/2000 | Kumberger et al. ........ 252/373 |
| 6,159,895 | A | * | 12/2000 | Koch et al. ................. 502/324 |
| 6,254,807 | B1 | | 7/2001 | Schmidt et al. ............. 252/373 |
| 6,413,449 | B1 | * | 7/2002 | Wieland et al. ............ 252/373 |
| 6,436,363 | B1 | | 8/2002 | Hwang et al. ............. 423/651 |
| 6,436,873 | B1 | * | 8/2002 | Brocker et al. ............ 502/439 |
| 6,534,432 | B1 | * | 3/2003 | Spivack et al. ............ 502/102 |
| 6,566,299 | B1 | * | 5/2003 | Spivack et al. ............ 502/302 |
| 6,616,909 | B1 | | 9/2003 | Tonkovich et al. ...... 423/648.1 |
| 6,700,029 | B2 | * | 3/2004 | Bogan et al. ............... 585/663 |
| 6,762,324 | B2 | * | 7/2004 | Ding .......................... 564/423 |
| 6,936,237 | B2 | * | 8/2005 | Wang et al. ................ 423/652 |
| 2001/0016188 | A1 | | 8/2001 | Haga et al. .............. 423/648.1 |
| 2001/0021469 | A1 | | 9/2001 | Kaneko ....................... 429/19 |
| 2001/0026782 | A1 | | 10/2001 | Wang ......................... 422/211 |
| 2003/0153455 | A1 | | 8/2003 | Wang ......................... 422/211 |

FOREIGN PATENT DOCUMENTS

| | | |
|---|---|---|
| EP | 1077081 | 2/2001 |
| JP | 60082137 | 5/1985 |
| JP | 05049930 | 3/1993 |
| WO | WO 00/76651 | 12/2000 |
| WO | WO 02/066370 | 8/2002 |
| WO | WO 03/040618 | 5/2003 |

OTHER PUBLICATIONS

Cubeiro et al., "Selective Production of Hydrogen by Partial Oxidation of Methanol over ZnO-Supported Palladium Catalysts," J. Catal., 179, 150, 157-158 (1998).

PCT Search Report, mailed Oct. 4, 2002, PCT/US 02/04527.

Cubeiro et al., "Partial oxidation of methanol over supported Palladium catalysts," Appl. Catal., A: General 168, 307-322 (1998).

Iwasa et al., "Steam reforming of methanol over Pd/ZnO: Effect of the formation of PdZn alloys upon the reaction," Appl. Catal., A: General 125, 145-157 (1995).

U.S. Appl. No. 10/434,443, filed May 7, 2003.

PCT Search Report and Written Opinion, mailed Mar. 14, 2005, PCT/US2004/013853.

Iwasa et al., "Effect of Zn addition to supported Pd catalysts in the steam reforming of methanol," Appl. Catal., A: General 248, 153-160 (2003).

PCT Preliminary Report on Patentability mailed Nov. 24, 2005, PCT/US2004/013853.

* cited by examiner 8.9%Pd-17.8%ZnO/Al2O3

10%Pd/ZnO

ALCOHOL STEAM REFORMING CATALYSTS AND METHODS OF ALCOHOL STEAM REFORMING

This invention was made with Government support under DARPA contract # DABT63-99-C-0039. The Government has certain rights in this invention.

FIELD OF THE INVENTION

The invention relates to steam reforming catalysts, and methods involving alcohol steam reforming or steam reforming in combination with methanation.

BACKGROUND OF THE INVENTION

The ever-decreasing size of microelectronic devices and the rapid development of microelectromechanical systems (MEMS) have created a great need for high energy density micropower supplies, for example, a power supply for microelectronic devices. Typically, conventional battery technology is used in these applications. However, current battery technology has a very low energy density, on the order of from 0.035 to 0.350 $kW_e$-hr/kg. An alternative to batteries is to combine a small fuel cell with a micro-hydrocarbon fuel processor. However, thus far, it has not been possible to construct a very small, thermally efficient fuel reformer. An additional problem is that many fuel cells require hydrogen gas having very low levels of carbon monoxide (CO) contamination. Therefore, it is also desirable for a microreformer to produce hydrogen that contains very little CO. Another problem is that instability in microcombustor operation can lead to partial vaporization of the hydrocarbon fuel, if it is liquid, and to less than desired conversion of the hydrocarbons to a hydrogen rich product stream due to the intermittent lack of energy for the endothermic reactions.

Prior attempts to lower CO in a reformate mixture have included: a two stage methanation process conducted at two temperatures over a 2% Rh/alumina catalyst (Van Keulen, U.S. Pat. No. 6,207,307); passage of the reformate through a palladium membrane followed by methanation of residual CO over a catalyst such as Ru, Rh, Pd, Ir, Pt, Ni and Re (Soma et al., U.S. Pat. No. 5,612,012); passage of the reformate through a hydrogen selective membrane followed by methanation of residual CO (Edlund, U.S. Pat. No. 5,861,137); and heating a gas in the presence of a water-gas shift catalyst to reduce the CO content to about 3000 parts per million (ppm), removing water, followed by reaction over Ru or Rh on alumina at below 250 C (Baker et al., U.S. Pat. No. 3,615,164).

Bohm et al. in U.S. Pat. No. 5,904,913 stated that methanol can be reformed at 220 to 280° C. over a Cu/ZnO on alumina catalyst. Bohm et al. reported that they had found that in their apparatus, for a methanol conversion above 98%, with a maximum reaction tube length of 160 cm, a reaction temperature of at least 260° C. should be selected. Lower temperatures would require longer reaction tube lengths. In their apparatus, for a catalyst loading of 1.3 kg, a productivity of 8 $Nm^3H_2$/h was achieved, which required a minimum temperature of 280° C. for 100% methanol conversion. To lower CO, output from the reforming reaction tubes can be passed to a CO converter to methanate the CO over a titania/alumina/Ru/$RuO_x$ catalyst with a Ru/$RuO_x$ fraction of between 2 to 4% at a maximum temperature of about 200° C.

The prior art processes for reforming hydrocarbons to produce hydrogen suitable for a fuel cell typically require multiple step operations in large and complex apparatus. Thus, there remains a need for microcombustors and fuel reformers which have a very small size, steady performance, and operate at low temperature with low CO output while maintaining high efficiency levels.

The development of better steam reforming catalysts has long been an area of intense interest. An example of some recent research appears in published patent application EP 1 061 011 A1. In this publication, Wieland et al. report a supported PdZn/ZnO catalyst for methanol steam reforming. A catalyst (Example A) was made by wash coating gamma-alumina onto a ceramic honeycomb, impregnating the gamma-alumina with an aqueous solution containing $Pd(NO_3)_2$ and $Zn(NO_3)_2$, followed by drying, calcining at 500° C. and reducing at 400° C.

Despite years of intense research, there remains a need for steam reforming catalysts and steam reforming methods with improved performance in terms of $H_2$ productivity, low temperature activity, and low CO selectivity.

SUMMARY OF THE INVENTION

The present invention provides microcombustors and microreformers which can be made with a very small size and which can operate at low temperature. The invention also provides devices utilizing the inventive microcombustors and/or microreformers instead of more conventional devices such as batteries. The invention also provides methods of fuel combustion and steam reforming. The invention further provides steam reforming catalysts and methods for their synthesis, and methods of steam reforming and methanation.

In one aspect of the present invention there is a microcombustor comprising: a first section comprising a combustion fuel channel having an inlet for connecting the microcombustor to a combustion fuel source and an outlet at a top surface of said first section; and a second section disposed next to the first section; the second section including: a combustion chamber having an inlet in fluid communication with the outlet of the channel of the first section and an outlet capable of evacuating combustion exhaust products; and an exhaust channel having an inlet in fluid communication with the outlet of the combustion chamber and an outlet at a surface of said second section; wherein the combustion fuel channel and the exhaust channel are disposed on a same side with respect to the combustion chamber, so as to form a first heat exchanger.

In a second aspect, the invention provides a microcombustor that includes: a gas inlet connected to a reaction chamber; a liquid feed system connected to the inlet of the reaction chamber; a reaction chamber having an internal volume of 100 $mm^3$ or less; an outlet connected to the reaction chamber; and a wick, packed tube or capillary tube disposed in at least one of the inlet or the outlet.

In another aspect, the invention provides a steam reformer, comprising a microcombustor as described above; and a third section comprising a reformation channel having an inlet for supplying reformation fuel and an outlet for evacuating reformation products, wherein the exhaust channel and at least a portion of the reformation channel are disposed on a same side with respect to the combustion chamber, so as to form a second heat exchanger.

In another aspect, the invention provides a steam reformer, including: a combustion chamber having an inlet and an outlet, a combustion catalyst being disposed in the combustion chamber; and a reformation chamber having an inlet and an outlet, a reformation catalyst being disposed in the reformation chamber, wherein the combustion catalyst and the reformation catalyst are disposed on opposite faces of a separation plate disposed between the combustion chamber and the reformation chamber.

In a further aspect, the invention provides a steam reformer, that includes: a combustion chamber having an inlet and an outlet, a combustion catalyst being disposed in the combustion chamber; and a reformation chamber having an inlet and an outlet, a reformation catalyst being disposed in the reformation chamber, the combustion chamber and the reformation chamber being disposed around an axis, the inlet and outlet of the combustion chamber being in fluid communication with combustion fuel and combustion exhaust channels, respectively, and the inlet and outlet of the reformation chamber being in fluid communication with reformation fuel and reformation products channels, respectively. The combustion fuel channel is disposed along the axis on a side of the combustion chamber opposite the reformation chamber. The reformation fuel channel is disposed along the axis on a side of the reformation chamber opposite the combustion chamber. The reformation products channel is disposed outside the reformation fuel channel with respect to the axis and on the side of the reformation chamber opposite the combustion chamber, and the combustion exhaust channel is disposed outside the reformation fuel channel with respect to the axis and on the side of the reformation chamber opposite the combustion chamber.

In yet another aspect, the invention provides a steam reformer that includes: a combustion chamber having an inlet and an outlet; and a reforming chamber having an inlet and an outlet. The outlet of the combustion chamber surrounds the outlet of the reforming chamber, and the outlet of the reforming chamber surrounds the inlet of the reforming chamber.

In a still further aspect, the invention provides a steam reformer, comprising: a combustion channel comprising a combustion chamber having an inlet and an outlet; and a reforming channel comprising a reforming chamber having an inlet and an outlet. The reforming chamber has two end sides and a peripheral lateral side. The combustion channel surrounds the reforming chamber over at least one of the end sides and the peripheral lateral side.

In another aspect, the invention also provides a steam reformer comprising: a first inlet connected to a first reaction chamber; a second inlet connected to a second reaction chamber; a heat transfer plate having first and second major surfaces, the first major surface being in thermal contact with the first reaction chamber, and the second major surface being in thermal contact with the second reaction chamber. The first reaction chamber comprises a combustion catalyst or a steam reforming catalyst, wherein, if the first reaction chamber comprises a combustion catalyst, the second reaction chamber comprises a steam reforming catalyst; or if the first reaction chamber comprises a steam reforming catalyst, the second reaction chamber comprises a combustion catalyst, and, the first inlet is connected to the first reaction chamber such that, during operation, fluid flows in more than one direction through the first reaction chamber.

In yet another aspect, the invention provides a steam reformer including: a first reaction chamber connected to a first inlet and a first outlet; and a second reaction chamber connected to a second inlet and a second outlet. The first reaction chamber and the second reaction chamber are in thermal communication. The first reaction chamber comprises a combustion catalyst or a steam reforming catalyst, wherein, if the first reaction chamber comprises a combustion catalyst, the second reaction chamber comprises a steam reforming catalyst; or if the first reaction chamber comprises a steam reforming catalyst, the second reaction chamber comprises a combustion catalyst. The first inlet and the first outlet are connected to the first reaction chamber such that, during operation, fluid flows in more than one direction through the first reaction chamber between the first inlet and the first outlet.

In a still further aspect, the invention provides a microcombustion process that includes: providing a composition comprising combustion fuel and oxidant to a combustion chamber, and passing the composition through a combustion catalyst. The combustion catalyst comprises a porous matrix arranged such that sufficient mixture flows through the catalyst to maintain combustion at a temperature of at most about 500° C. The composition in the combustion chamber is reacted to produce sufficient heat to sustain the microcombustion process without energy input.

In another aspect, the invention provides a steam reforming process that includes: passing a reformation gas through a reforming chamber. The combustion of a combustion fuel in a combustion chamber is maintained so as to transfer heat from the combustion chamber to the reforming chamber. The temperature difference between the combustion chamber and the reforming chamber is at most about 100° C.

In a yet further aspect, the invention provides a method of making hydrogen gas, comprising: passing a composition comprising $H_2O$ and hydrocarbon into a reforming chamber and reacting the $H_2O$ and hydrocarbon in said reforming chamber to form a hydrogen rich gas mixture. A composition comprising fuel and oxidant is passed into a combustion chamber and, simultaneously to the step of reacting $H_2O$ and hydrocarbon, the fuel and oxidant in the combustion chamber are reacted to produce heat. The reforming chamber and the combustion chamber are separated by a thermally conductive layer. Heat is transferred from the combustion chamber to the reforming chamber. The average thermal transport distance from the combustion chamber to the reforming chamber is 1 mm or less. This "thermal transport distance" is measured from the area within a combustion zone where combustion occurs. The above aspect of the invention is typically associated with at least one of the following characteristics: (1) at least 80% of the fuel is oxidized in the combustion chamber and the thermal efficiency of the method is at least 5%; (2) hydrogen gas production of at least 30 sccm (standard cubic centimeters per minute) $H_2$ per cc of steam reformer volume; or (3) hydrogen gas production of at least 1 sccm $H_2$ per cc of device volume.

In yet another aspect, the invention provides a method of steam reforming that includes: passing a reformation gas through a reforming chamber, maintaining combustion of a combustion fuel in a combustion chamber so as to transfer heat from the combustion chamber to the reforming chamber. The reforming chamber is configured such that the volume of the chamber increases as a function of distance from a reaction chamber inlet; and reformation gas and products expand as they pass through the reforming chamber.

In another aspect, the invention provides an integrated combustor, comprising: a combustion chamber comprising a combustion catalyst; an endothermic reaction chamber comprising a catalyst, the endothermic reaction chamber having a length; and a thermally conductive wall disposed between the combustion chamber and the endothermic reaction chamber. The combustion catalyst is disposed on a side of the endothermic reaction chamber such that, during operation, heat from a combustion reaction on the combustion catalyst is transferred along the length of the reforming chamber, and such that less than 10% of total heat flux into the endothermic reaction chamber is perpendicular to length. "Length" is the direction of a chamber that is parallel to flow through the chamber. Length, height and width are mutually perpendicular. Relatively short deviations in the direction of flow, such as flow from the tube toward and down the separator plate in FIGS. 6–7, does not change the direction of length which is determined by the primary direction of flow through or past a catalyst. This aspect excludes parallel plate type configurations where a significant (at least 10%) component of heat transfer is perpendicular to length.

The invention also includes a method of transferring heat to an endothermic reaction in the integrated combustor described in the preceding paragraph. In this method, a fuel combusts on the combustion catalyst and generates heat in the combustion chamber. Heat from the combustion chamber transfers through the thermally conductive wall into the endothermic reaction chamber and along the length of the endothermic reaction chamber where less than 10% of total heat flux into the endothermic reaction chamber is perpendicular to length. That a fuel "combusts on the combustion catalyst" means contacting a fuel with a solid catalyst, including within a porous catalyst or over a catalyst coating.

In another aspect, the invention provides a method of reforming an alcohol in a device having adjacent combustion and steam reforming chambers, comprising: combusting a fuel in a combustion chamber; transferring heat from the combustion chamber across a chamber wall into a steam reforming chamber; reforming an alcohol at a temperature of 300° C. or less to produce a product stream comprising $H_2$ in a $H_2$:CO ratio of 70:1 or less. This method has a thermal efficiency of at least 10%.

The invention also provides an integrated combustor/reformer, comprising: a combustion chamber comprising a combustion catalyst; a reforming chamber comprising a reforming catalyst; and a thermally conductive wall separating the combustion chamber and the reforming chamber. The integrated combustor/reformer possesses a thermal efficiency such that when $H_2O$ in a 1.2:1 molar ratio are feed into the reforming chamber at a contact time of 1.0 seconds, and fuel and oxygen are combusted in the combustion chamber at a rate sufficient to obtain an average temperature of 320° C. within the combustion chamber, there is, at steady-state, a thermal efficiency of at least 10%, and the product gas contains 0.5% or less CO.

In another aspect, the invention provides an integrated combustor/reformer, comprising: a combustion chamber comprising a combustion catalyst; a reforming channel comprising an inlet, a reforming chamber containing a reforming catalyst, and an outlet; a thermally conductive wall separating the combustion chamber and the reforming chamber. The reforming channel further comprises a methanation catalyst (1) in direct contact with reforming catalyst, or (2) disposed between the catalyst and the outlet wherein there is no $H_2$-selective membrane disposed between the reforming catalyst and the methanation catalyst and wherein there is not a separate heat exchanger in thermal contact with the methanation catalyst. The reforming channel has at least one dimension of 5 mm or less.

The invention also provides a method of reforming an alcohol, comprising: passing a reactant mixture comprising alcohol and water into a reforming channel comprising an inlet, a reforming chamber, a reforming catalyst, a methanation catalyst, and an outlet; passing a fuel and an oxidant into a combustion chamber comprising a combustion catalyst; wherein the fuel in the combustion chamber combusts to produce heat that transfers across a thermally conductive wall into the reforming chamber; maintaining the temperature of the reforming catalyst in the range of 200 to 400° C. and maintaining the temperature of the methanation catalyst in the range of 220 to 270° C. There is a portion of reforming catalyst that is closest to a portion of methanation catalyst and the temperature difference between the portion of reforming catalyst that is closest to a portion of methanation catalyst and the portion of methanation catalyst closest to the reforming catalyst is 20° C. or less. The reforming catalyst and methanation catalyst are disposed in the reforming channel such that reformed products do not pass through a $H_2$-selective membrane before contacting the methanation catalyst. At least 80% of the alcohol is converted to products and, after contacting the methanation catalyst, a product stream is produced that contains $H_2$ in a $H_2$:CO ratio of at least 100 and contains less than 20 mol % of the alcohol present in the reactant mixture.

In another aspect, the invention provides a method of reforming an alcohol, in a device having adjacent combustion and steam reforming chambers, comprising: combusting a fuel in a combustion chamber; transferring heat from the combustion chamber across a chamber wall into a steam reforming chamber and reforming an alcohol to produce a product stream comprising at least 5 sccm $H_2$ per cc of total device volume in a $H_2$:CO ratio of 70:1 or less. The device has a total volume of 20 ml or less; and the $H_2$:CO ratio of 70:1 or less is obtained without a $H_2$-selective membrane. In a related aspect, the invention provides an integrated combustor/reformer comprising: a combustion chamber comprising a combustion catalyst; a reforming chamber comprising a reforming catalyst; and a thermally conductive wall separating the combustion chamber and the reforming chamber. The integrated combustor/reformer possesses a hydrogen productivity such that when $H_2O$ in a 1.2:1 molar ratio are feed into the reforming chamber at a contact time of 1.0 seconds, and fuel and oxygen are combusted in the combustion chamber at a rate sufficient to obtain an average temperature of 320° C. within the combustion chamber, there is produced a product stream comprising at least 5 sccm $H_2$ per cc of total device volume in a $H_2$:CO ratio of 70:1 or less. The device has a total volume of 20 ml or less; and does not contain a $H_2$-selective membrane. In preferred embodiments, the test conditions use hydrogen and air in the combustion chamber at a $H_2$:$O_2$ ratio of 0.5.

In a further aspect, the invention provides an alcohol steam reforming catalyst, comprising: Pd and Zn in a Pd:Zn molar ratio of 0.1 to about 0.8 dispersed on an oxide support. This catalyst possesses unexpectedly superior performance characteristics as compared to prior art catalysts such as those described by Wieland et al. in EP 1061011A1. For example, the catalyst is characterizable by an activity such that, when 0.19 g of the catalyst is packed in a 4 mm inner diameter quartz tube and heated to 260° C., and a 1:1 weight ratio solution of methanol and water are feed into the tube at a liquid flow rate of 2 ml/h, vaporized and passed through the catalyst, at least 70% of the methanol is converted to products and the selectivity to CO is 2% or less. Preferably, when tested under these conditions, the $H_2$ productivity of the catalyst is at least 100 $Nm^3$/kg Pd/h. Preferably, the catalyst comprises 5 to 12 weight % Pd.

The invention also includes methods of steam reforming an alcohol using the catalyst described above. In this method, a process stream comprising alcohol and water contact the catalyst a temperature in the range of 200 to 400°

C. to form a product stream. Preferably the product stream contacts a methanation catalyst at a temperature of 220 to 270° C. to produce a second product stream comprising $H_2$ in a $H_2$:CO ratio of 70:1 or more. In this method, the process stream passes from the reforming catalyst to the methanation catalyst without any intervening separation step.

The invention also provides a new method of making an alcohol steam reforming catalyst. In this method, an aqueous solution comprising zinc nitrate is heated to increase the concentration of zinc in excess of the concentration that would be dissolved at room temperature. An aqueous solution containing dissolved Pd and Zn is formed, and then the Pd and Zn are coprecipitated on an oxide support. The invention further provides catalysts prepared by this method.

The various inventive aspects can be described in combination with any of the details described in the drawings and the following Descriptions of the Preferred Embodiments section. For example, the inventive methods can be further described by combining with the flow rates described in the Descriptions section. The invention also includes $H_2$-producing systems or fuel cell systems that contain any of the combustors and/or reformers described herein. The invention also includes devices under operating conditions. The invention also includes methods of making hydrogen, or methods of combustion or steam reforming that utilizes any of the combustors and/or reformers described herein. In any of the foregoing aspects, there may be a methanation catalyst that is mixed with a reforming catalyst in the reforming chamber and/or a methanation catalyst disposed between the reforming chamber and an outlet.

Various embodiments of the invention can provide numerous advantages including one or more of the following. First, light-weight and compact energy sources can be obtained. Further, the rapid heat and mass transfer in a small device can enable the use of extremely active catalysts, catalyst which are active at low temperature, and catalysts with high throughput per volume. It is also possible to control process conditions, such as operating temperature, very precisely, so that high performance can be attained. The fuel combustion and steam reforming processes can be stably and efficiently operated at lower temperatures, without the need for energy input to sustain or even to start the microcombustion process. In some instances, the microcombustor is started with hydrogen or vapors such as methanol. Heat losses can be effectively controlled and reduced. Another advantage is that the simplicity of the design and the materials used enable mass production at competitive costs. Advantages can also include higher conversions, lower CO selectivities, and simplicity of design.

Another advantage that results from small size is better control of heating and uniformity of temperature in a reaction zone. Another advantage is an extremely fast response time, that is, a change in fluid flow can result in a nearly instantaneous change in temperature.

Further, the microcombustor or microreformer can be part of an efficient integrated system, which can reform lower hydrocarbons and even higher hydrocarbons that require higher processing temperature, such as butane. Carbon dioxide selectivity over carbon monoxide, a poison to fuel cells, of the steam reforming process is high, so that it is possible to avoid or reduce requirements for removing carbon monoxide after reforming and before supplying the gas to the fuel cell, thereby greatly simplifying the overall system and reducing system size. Since catalytic combustion is used, stable low temperature performance is easily attained for the combustor to provide uninterrupted operational heat for vaporizers and steam reformer units so they may operate in a steady optimal manner.

The low temperature operation and manufacturing made possible by the invention allows a greater choice of insulating materials, enables greater use of materials with dissimilar thermal expansion coefficients, and enables manufacture on semiconductor chips. The inventive combustors and reformers can be made from plastic. There are numerous advantages of manufacturing in plastic including low weight and less required insulation.

Additional advantages include: more design options, cheap high volume manufacturing, eliminating the need for expensive manufacturing machines (compared to the equipment used in silicon processing), and inexpensive materials.

The subject matter of the present invention is particularly pointed out and distinctly claimed in the concluding portion of this specification. However, both the organization and method of operation, together with further advantages and objects thereof, may be better understood by reference to the following description taken in connection with accompanying drawings wherein like reference characters refer to like elements.

GLOSSARY OF TERMS

"Catalyst" is a solid material that enhances reaction rate.

"Chamber" refers to the area in which a reaction takes place. In the present invention, in embodiments where a catalyst is in the chamber, the volume of a chamber includes the catalyst (including pores), the area above, below and to the sides of the catalyst, but not the area to the exhaust side of the catalyst. Illustrative examples are shown in the figures. For example, in FIG. 4 area 426 is part of the reaction chamber while 428 is not.

"Channels" refers to the generally accepted meaning and includes conduits and other means for directing the flow of a fluid. Channels of the invention include at least one opening, typically with an inlet and outlet, and may include other openings. As will be seen in the description below of various embodiments, numerous functions other than simple mass transport can occur within channels.

"Fluid communication" between two areas means that a fluid can flow from one area to the other. "Thermal communication" between two areas means that heat can flow from one area to the other.

That "fluid flows in more than one direction" means that there is more than one fluid flow path. For example, in a straight or curved pipe there is only one fluid flow path (fluid flows in only one direction); while in a pipe with a T-joint, there are two flow paths (fluid flows in two directions). An example of fluid flowing in more than one direction is shown in combustion chamber 402 of FIG. 4.

"Heat exchanger" is a device or component designed such that heat can be transferred from one fluid to another.

"Layer" refers to a defined area comprising certain listed elements. Typically layers are stacked in multiple-layer configurations. Preferably, layers are planar or substantially planar meaning that projections from a layer make up less than 20% of the area of the layer.

A "section" is a layer or portion of a layer.

"Micro," such as in microcombustor, refers to devices in which there is at least one dimension of a channel or chamber that is 1 mm or less.

"Peripheral lateral side" means a portion of a volume which surrounds a central portion of the volume and is lateral with respect to a main axis or line of the volume.

"Separator plate" is a solid structural component (e.g., a wall) that separates one channel from another channel.

"Thermally conductive" means that a material transfers heat at a rate that is practical for operation of a device. Examples of thermally conductive materials include materials such as steel and alumina, while non-thermally conductive materials include materials such as Styrofoam and polyurethane. In practice, high thermal conductivity may be balanced against factors such as cost, stability, and compatibility.

A "thermal cycle" is heating a device up to operational temperature, operating the device at an operating temperature and observing the results, and cooling the device to about room temperature.

"Thermal efficiency" is calculated by dividing the lower heating value of the hydrogen in the reformats stream by the total heating value of the methanol fed the reformer plus the heating value of the fuel fed to the combustor as follows: Efficiency=$\Delta H_c$hydrogen/($\Delta H_c$methanol reformer feed+$\Delta H_c$ combustor fuel feed) where $\Delta H_c$ is the lower heat of combustion of hydrogen, methanol, or fuel as indicated. This is the equation used to calculate efficiency. $\Delta H_c$ of the feed will vary depending on the type of feed and conditions and the values can be found in standard tables such as Perry's Chemical Engineers Handbook.

"Volume" of a combustor, combustion chamber, reformer chamber or reformer, unless otherwise indicated, refers to the internal volume where reaction substantially occurs but not adjacent material. For example, in FIG. 1 the volume of the combustion chamber is the volume of cavity 118 (including catalyst 124), in FIG. 3 the volume of the combustion chamber is the volume of catalyst 316, and in FIG. 4 the volume of the catalyst 416. Where a catalyst is present, the volume includes at least the catalyst volume and catalyst void fraction. Volume of a device, unless otherwise indicated, refers to the combustor and reformer volume and the volume of any intervening and integral components such as heat exchangers, preheaters, vaporization chambers, recuperators, etc. In FIGS. 1–4 the volume of the device is the volume of the main body of the rectangular block or largest cylinders, but not the inlet and outlet tubes that stick out of the main body.

"Wick" is a material that transports liquid, usually the driving forces for transport through the wick are capillary forces or a pressure gradient, but other mechanisms such as a graded material with differing degrees of hydrophilicity could be employed.

DESCRIPTION OF PREFERRED EMBODIMENTS

The illustrations in the figures are not intended to limit the scope of the invention.

Figure 1:
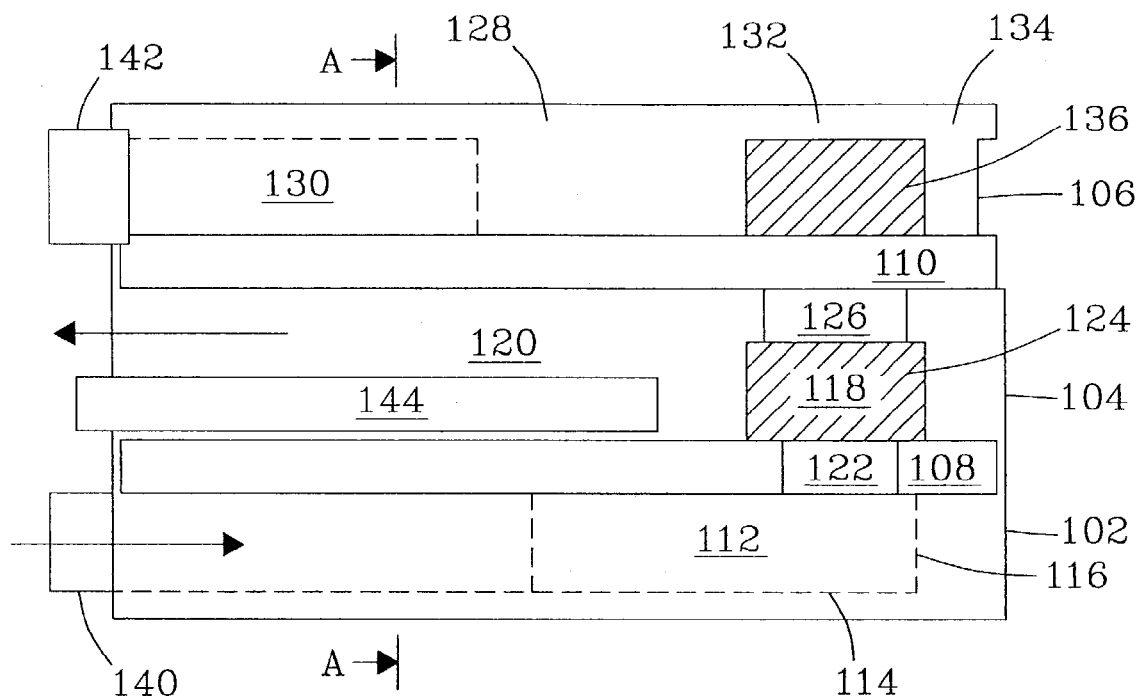
FIG. 1 is a cross-sectional side view of a microreformer in a first embodiment according to the present invention.
Figure 2:
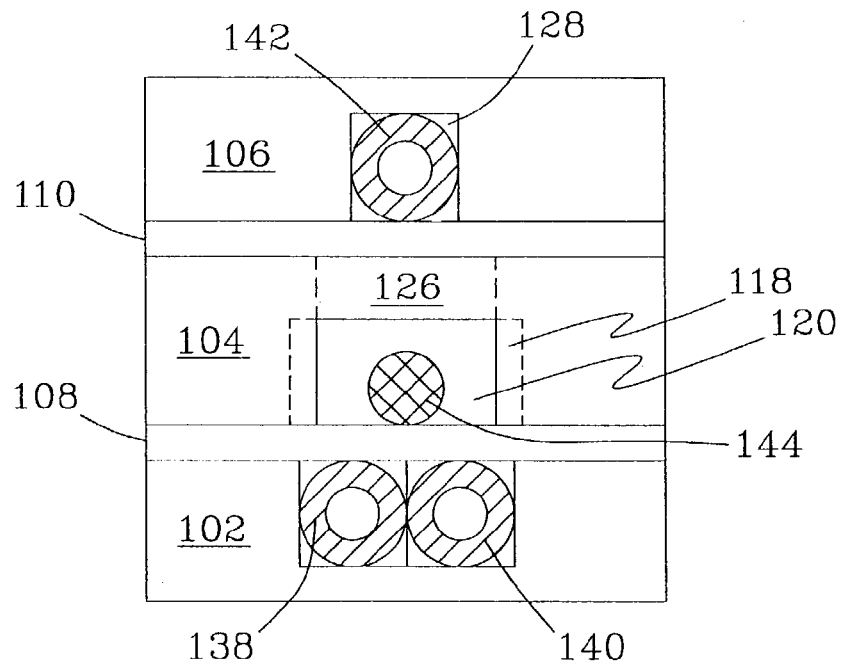
FIG. 2 is a cross-sectional front view of the microreformer of FIG. 1 along line A—A of FIG. 1.

A steam reformer of a first embodiment with a layer design is shown on FIGS. 1 and 2. The illustrated steam reformer comprises three substantially rectangular layers, namely, a fuel supply layer 102, a combustion layer 104, and a steam reforming layer 106, disposed one above the other. These layers are separated by first and second separation plates 108, 110, respectively. The layers and plate are described as disposed one above the other with reference to the figures, but the layers could be disposed in other geometric configurations, for example, they could be formed as sections disposed next to each other.

The fuel supply layer 102 comprises a fuel supply channel 112, which is formed as a substantially longitudinal groove 114 in an upper surface of the fuel supply layer. The groove has an open end on a side face of the steam reformer, while an opposite end 116 of the groove is closed laterally. The combustion layer comprises a cavity 118, which operates as a combustion chamber, and an exhaust channel 120, which is disposed substantially longitudinally, and is open on both the upper and the lower surface of the combustion and exhaust layer. The fuel supply channel and the exhaust channel operate as the combustion chamber inlet and outlet, respectively.

The combustion chamber is disposed above the laterally closed end of the fuel supply channel, and the first separation plate 108 has an opening 122 under the combustion chamber, so that the fuel supply channel and the combustion chamber are in fluid communication. In the embodiment shown, the fuel supply channel and the exhaust channel are disposed on the same lateral side of the combustion chamber, and they are preferably parallel to each other.

A combustion catalyst 124 is disposed in the combustion chamber. The combustion catalyst can fill the whole combustion chamber, or a space 126 can be provided between the combustion catalyst 124 and the second intermediary plate 110 as shown on FIG. 1 to allow for fluid expansion and flow to the exit chamber. Various types of catalysts which can be used as combustion catalysts are disclosed in detail below.

The steam reforming layer 106 comprises a reforming channel 128 which is disposed substantially longitudinally, and is open on the under face and opposite side faces of the steam reforming layer. Thus, a first portion of the reforming channel constitutes a reforming fuel supply channel 130, a second portion of the reforming channel constitutes a reforming chamber 132, and a third portion of the reforming channel constitutes a reformation products channel 134. The reforming fuel supply channel and the reformation products channel operate as the reforming chamber inlet and outlet, respectively.

The reforming chamber 132 is disposed substantially above the combustion chamber 118, and the reforming fuel supply channel 130 is disposed on a same lateral side of the combustion chamber as the exhaust channel 120, more precisely, the reforming fuel supply channel and the exhaust channel are preferably parallel to each other. A reforming catalyst 136 is disposed in the reforming chamber. The first and second separation plates are made of a heat conductive material, so that heat from the combustion exhaust in the combustion exhaust channel can be transferred, on the one hand, to the combustion fuel in the fuel supply channel, and on the other hand, to the reforming fuel in the steam reforming channel. Thus, the combustion fuel supply channel 112 and the exhaust channel 120 form a first heat exchanger, and the reforming fuel supply channel 130 and the exhaust channel 120 form a second heat exchanger. The first heat exchanger makes it possible to vaporize and/or preheat a combustion fuel mixture prior to its delivery into the combustion chamber, and the second heat exchanger makes it possible to vaporize and/or preheat a reformation fuel mixture prior to its delivery into the reforming chamber.

The catalyst 124 is surrounded by solid material except for a 7° side opening and a top opening to expansion chamber 126. Exhaust gases travel out of the 7° side opening into open exhaust channel 120. This opening allows gases to flow out of the combustion chamber.

The combustion fuel supply channel 112 is in fluid communication with a source of combustion fuel such as a hydrocarbon fuel, for example methanol, and a source of oxidant, for example oxygen in air. As shown on FIG. 2, a combustion fuel tube 138 and an air tube 140 are inserted into the combustion fuel supply channel. Similarly, the reforming fuel channel 130 is in fluid communication with a source of reforming fuel, in that a reforming fuel tube 142 is inserted into the reforming fuel channel. Evacuation of exhaust liquids, in particular liquid water, is facilitated in that a capillary tube or wick 144 is inserted into the exhaust channel. Exhaust can be expelled into the environment directly from the outlet of the exhaust channel 120, as shown on FIG. 1. In the alternative, the exhaust channel could be connected to an exhaust tube for evacuating exhaust at a location further away from the microreformer, or the exhaust channel could be in fluid communication with a collecting container so as not to release exhaust fluids into the environment. Means of removing liquids, or preventing the formation of liquids, in the outlet can provide significant advantages—especially in small devices where the formation of liquid droplets may cause "slugging" and poor device performance.

In another embodiment, a wick can be used to transport liquid into or out of a steam reformer. In some preferred embodiments, a wick is inserted into the exhaust of either the steam reformer or combustor. to expedite liquid removal from the channels.

Figure 3:
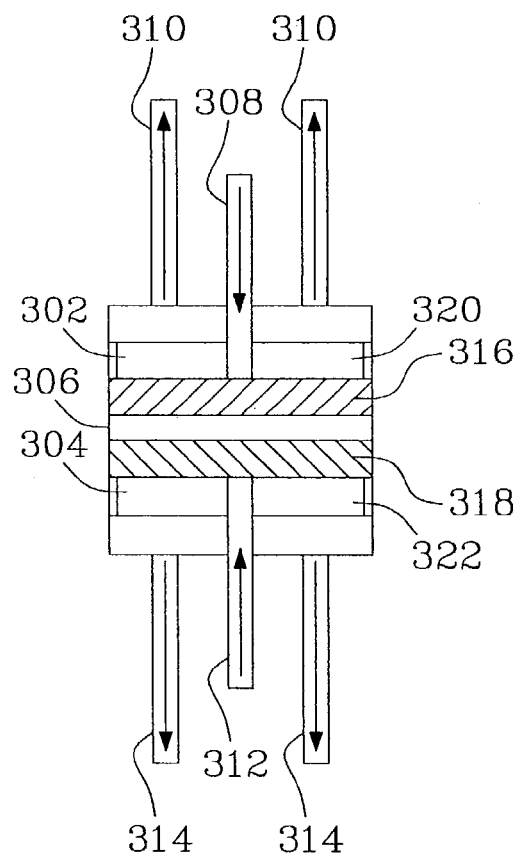
FIG. 3 is a cross-sectional front view of a microreformer in a second embodiment according to the present invention.

A microreformer of a second embodiment according to the present invention with a plunger design is shown on FIG. 3. In this embodiment, a combustion chamber 302 and a reforming chamber 304 are disposed opposite a transverse separation surface 306 along a main longitudinal axis of the microreformer. The separation surface 306 can be a separation plate. For example, the chambers are cylindrical, each chamber being formed by a rear wall and a peripheral wall centered on the main longitudinal axis, the chambers being closed by the separation plate.

Inlet and outlet, respectively 308, 310 are provided on the combustion chamber 302 from a side opposite the separation plate. Similarly, inlets and outlet, respectively 312, 314 are provided on the reforming chamber 304 from a side opposite the separation plate. Preferably, the inlet of at least one chamber being disposed in a central portion relative to the main longitudinal axis and the outlet being disposed in a peripheral portion relative to the main longitudinal axis. For example, the inlet and outlet channels are disposed substantially parallel to the main longitudinal axis, and tubes forming the combustion inlet channel and the reforming inlet channel are disposed along the main longitudinal axis while two tubes forming the combustion outlet channels and reforming outlet channels, respectively, are disposed in symmetrical positions relative to the respective inlet channel, as shown on FIG. 3.

A combustion catalyst 316 and a reforming catalyst 318 can be placed on opposite faces of the separation plate, for example, as coatings. Fuels can be supplied into the respective catalysts in that the inlet tubes open directly against or into the catalyst material. Heat is transferred from the combustion chamber to the reforming chamber through the separation plate.

The catalysts can fill the whole chambers, or a space can be provided in a portion of the respective chamber. For example, a space respectively 320, 322 in fluid communication with the outlet channels can be provided in a portion of one or both chambers opposite the separation plate so as to surround the inlet tube, as shown in FIG. 3. In that case, a transverse catalyst plate is preferably disposed in the respective chamber to separate the portion of the chamber which is filled with catalyst and the portion of the chamber without catalyst. An advantage of this variant is that outlet gases fill this portion of the chamber or chambers, so that heat can be transferred from the outlet fluids to the inlet fluids.

In the combustion chamber as well as in the reforming chamber, the fuel flows in more than one direction from the inlet to the outlet. In other words, the inlet and outlet are disposed such that more than one line can be traced from the center of an inlet to the center of an outlet across the chamber. In a preferred embodiment, fuel expands radially through a catalyst. In preferred embodiments, gas moves fast near the inlet and then slows as it moves through the catalyst. In some preferred embodiments, the gas is hottest at the center of the catalyst and near the inlet, thus providing precise delivery of thermal energy.

In another variant (not shown) of this embodiment, the two outlet tubes of at least one of the chambers are replaced by a single outlet tube surrounding the inlet tube.

Figure 4:
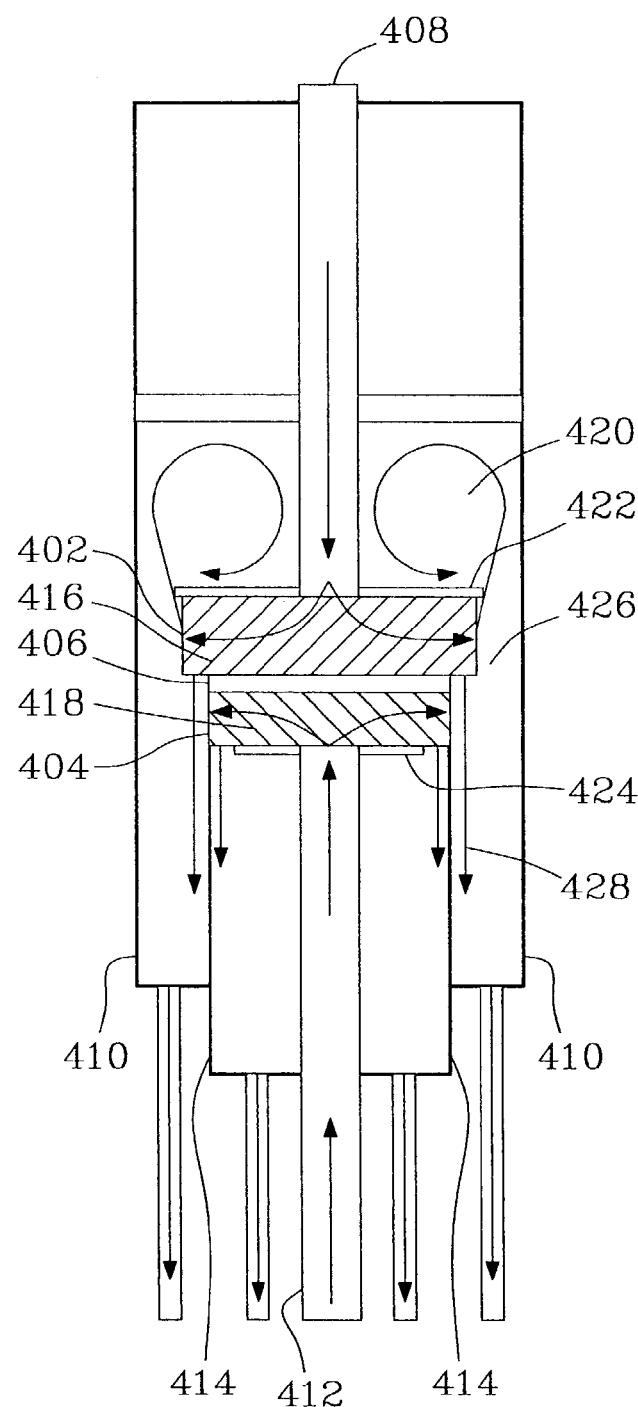
FIG. 4 is a cross-sectional front view of a microreformer in a third embodiment according to the present invention.

A microreformer of a third embodiment according to the present invention with a second plunger design is shown on FIG. 4. In this third embodiment, a combustion chamber 402 and a reforming chamber 404 are disposed on opposite sides of a transverse separation surface 406, for example a separation plate, along a main longitudinal axis of the microreformer. A centrally positioned inlet tube 408 parallel to the main longitudinal axis opens into the combustion chamber 402 through its rear face, i.e., the side opposed to the separation plate, as in the second embodiment. However, this embodiment differs from the second embodiment in particular in that an outlet channel 410 of the combustion chamber is on the side of the reforming chamber 404. More precisely, an inlet channel 412 of the reforming chamber is surrounded by an outlet channel 414 of the reforming chamber, which is formed as an annular channel. Further, the outlet channel 410 of the combustion chamber is also formed as an annular channel surrounding both the reforming chamber 404 and the outlet and inlet channels respectively 414, 412 of the reforming chamber. This construction makes it possible to transfer heat from the reforming outlet to the reforming inlet, also from the combustion outlet to the reforming chamber and both the reforming inlet and outlet.

Catalysts respectively 416, 418 are placed in the respective chambers, for example on or against the separation plate. Advantageously, the inlet in at least one chamber opens directly onto the catalyst.

In this third embodiment, the catalyst can fill the whole or only a portion of each chamber, as in the second embodiment. In the variant shown on FIG. 4, the catalyst fills the whole chamber, a rear exhaust chamber 420 in fluid communication with the combustion chamber and the exhaust channel is provided around the combustion inlet tube, so as to transfer heat from the combustion exhaust to the combustion fuel. A transverse catalyst plate 422 is disposed between the combustion chamber 402 and the rear exhaust chamber, and a transverse catalyst plate 424 is disposed between the reforming chamber 404 and its outlet 414. Annular area 426 is the exhaust channel and 428 is the exhaust flow.

Fluid flow is directed such that the heat generated in the exothermic side of the reactor is used to optimize the transfer of heat to the endothermic side of the reactor via conductive heat transfer, and to preheat the fuel streams to achieve vaporization via convection.

Reactants are fed through an inlet formed as a central feed tube such that the vaporized feed contacts the respective catalysts at the centers of the catalyst disks. The fluid flows radially, in all directions, out from the center of the catalyst disk as a mixture of diminishing concentration of unreacted fuel to exhaust products. As the fluid mixture diffuses through the catalyst bed, unreacted fuel contacts unused catalyst reaction sites such that all of the fuel is reacted prior to entering the exhaust chamber.

By directing the flow in this manner a temperature gradient is established between the center and the outer edges of the catalyst bed with the highest temperature at the center of the thermally conductive transverse separator plate located between the two reactor chambers; thus minimizing heat loss through the reactor walls.

The heated exhaust gases typically enter the exhaust chamber at temperatures ranging from 80° C. to 400° C., but preferably above 100° C. High exhaust gas temperatures may be indicative of unreacted fuel entering the exhaust chamber while low exhaust gas temperatures are indicative of a low fuel feed rate, or an unreactive catalyst bed.

Figure 6:
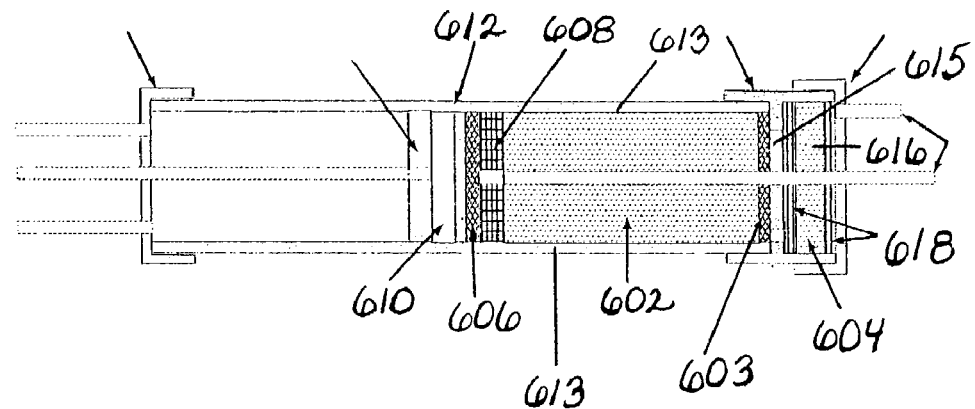
FIG. 6 is a cross-sectional front view of a microreformer in a fourth embodiment according to the present invention.

FIG. 6 is similar to the embodiment of FIG. 3 except that additional reforming catalyst 602, 603 and methanation catalyst 604 are disposed downstream of steam reforming catalyst felt 606. In the illustrated embodiment, the optional plunger 608 is porous, allowing fluid to flow therethrough. Heat from the combustion chamber 610 is conducted through separation plate 612 into catalyst felt 606 and is then carried by conduction and convection through the reforming catalyst bed 602, 603. The steam reforming catalyst 602 could be a powder catalyst that is held in place by catalyst felt 603. The reforming chamber is defined by reactor walls 612, 613, 615. Many alternatives are possible, for example, the plunger 608 can be omitted and the reaction chamber completely or partly filled by a continuous, porous reforming catalyst, catalyst powder, or catalyst pellets. The reformats stream passes directly into adjacent methanation chamber 616. The methanation catalyst can be a single material or a mixture of materials such as a methanation catalyst powder between methanation catalyst felts 618. A small reforming chamber, such as having a diameter of 5 mm or less provides superior results by enhancing uniformity of conditions such as reducing hot and cold spots and reducing channeling through a powdered catalyst.

Figure 7:
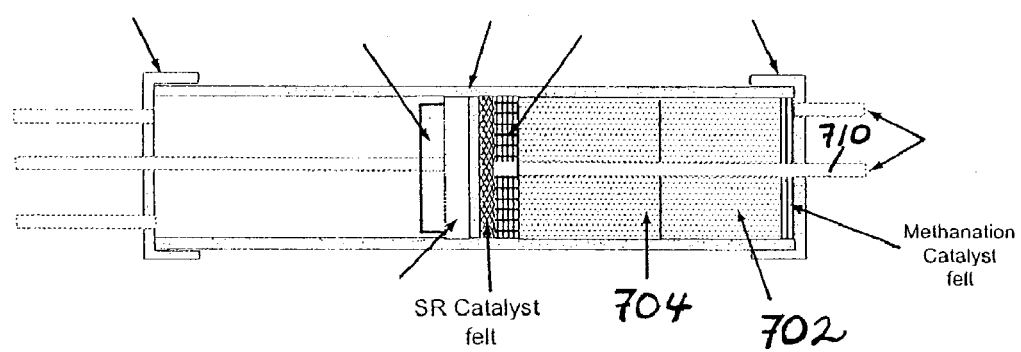
FIG. 7 is a cross-sectional front view of a microreformer in a fifth embodiment according to the present invention.

The device illustrated in FIG. 7 is similar to the device of FIG. 6 except that a methanation catalyst 702 is placed in contact with the steam reforming catalyst 704. In this case, the reforming chamber is defined at one edge by the methanation catalyst 702. Where the catalysts are powders, there will not be a sharp delineation between reforming and methanation zones and some methanation catalyst powder will intermix with the reforming catalyst powder so that some methanation catalyst is present within the reforming chamber (the reforming chamber volume being defined by the volume where there is a significant amount of reforming catalyst such that a reforming reaction could take place under normal operating conditions. Methanol and water can be injected at room temperature into inlet tube 710 where they will be vaporized by heat conducted through the tube from the methanation and reforming catalysts.

Figure 5:
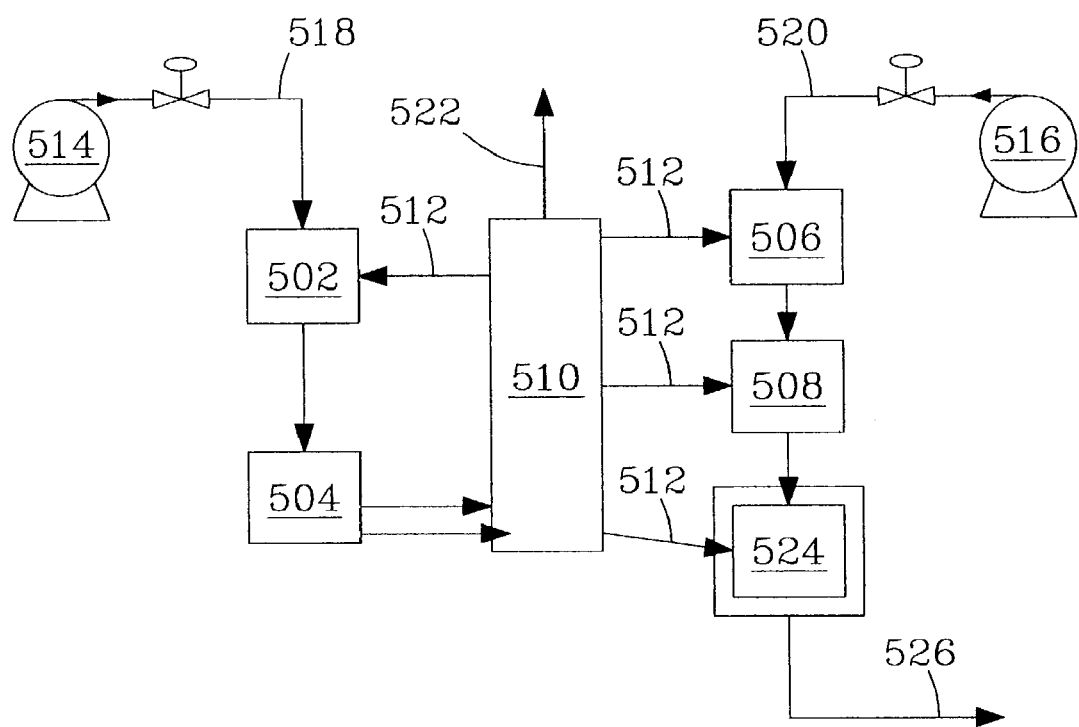
FIG. 5 is a schematic view of a steam reforming system according to the present invention.

A microreformer can be integrated into a hydrogen producing system as shown schematically on FIG. 5. A microreformer of the present invention is shown on FIG. 5 as a combustion fuel vaporizer/preheater 502, a combustor unit 504, a reforming fuel vaporizer/preheater 506, a reforming reactor 508, and a heat exchanger 510 which directs heat from the combustor unit to the combustion fuel vaporizer/preheater, the reforming fuel vaporizer/preheater and the reforming reactor, as shown by arrows 512 on FIG. 5. Each of the combustion and reforming fuel mixtures is provided through at least a pump and valve system respectively 514, 516 and a feed line respectively 518, 520. Exhaust is evacuated from the combustor through the heat exchanger 510 and line 522. In a fuel cell system, reforming fluids can be treated in an optional gas clean-up unit 524 before being directed through line 526 toward a fuel cell (not shown) where reformation products (including $H_2$) are combined with $O_2$ to generate electricity. The secondary clean-up process may include a preferential oxidation reactor or a methanation reactor or both, membrane separation of either hydrogen or carbon monoxide, a sorption based separation system for either hydrogen or carbon monoxide, and the like.

In practice, fuel processing systems may be significantly more complex. For example, heat from a combustor can also be used to supply heat for other processes such as steam generation (not shown) that can be utilized for a steam reformer, autothermal reactor and water gas shift reactor. Various fuel cells are well-known and commercially available and need not be described here. Instead of a fuel cell, the hydrogen-containing gas could, for example, go to: a storage tank, a refueling station, a hydrocracker, hydrotreater, or to additional hydrogen purifiers.

Combustor/Reformer Characteristics

Materials And Device Manufacture

Various materials or combinations of materials can be used in the microreformer of the present invention. For example, a metal or a ceramic, such as zirconia, is preferably used for the layers while a metal, such a stainless steel, aluminum, brass or copper, is preferably used for the intermediary plates. The materials are preferably resistant to steam or oxygen corrosion. As a variant, a plastic material, such as polymide, is used for the layers only, or for both the layers and the separation plates. The fuel supply tubes can be plastic or metallic, for example, stainless steel. A wick is preferably a material such as fibers or foams that utilize capillary forces to transport liquids, such as cotton or felt; alternative means such as hydroscopic materials (e.g. silica) or materials with hydrophilic surface properties may also be employed as wicks.

In some preferred embodiments, the external reformer/combustor walls are insulating materials. In some embodiments, there is no elemental silicon or doped silicon in the device, for example, the reactor walls are not composed of silicon. To avoid heat loss and increase thermal efficiency, the reactor walls are preferably as thin as possible.

Various components for these microcombusters and microreformers can be manufactured using standard techniques for producing small metal, ceramic, and/or plastic parts. For example, the body and plungers for a combined reactor assembly can be stamped from a standard metal press fitted with the appropriate dies, and the end-cap assemblies can be extruded as completely assembled units. Assembly joins the end-cap assemblies to the catalyst filled body and plungers via standard parts joining processes, which may, for example, employ the use of adhesive bonds or metals soldering techniques. When end caps are utilized, they may be welded, brazed, screwed on, snapped on, or adhered on using a high temperature adhesive.

Combustor/Reformer Geometry and Configuration

Reactor configurations include, but are not limited to, the designs described in connection with the figures. The components of an integrated combustor/reformer may include: a combustion chamber, a reforming chamber, a wall separating the combustion and reforming chambers, a preheater or preheat zone, a vaporizer or vaporizing zone, and a methanation chamber or methanation zone. The combustion chamber and reforming chamber are oriented so that heat is transferred from the combustion chamber into the reforming chamber. Both the combustor and reformer should have a separate preheater (and/or a vaporizer) or a preheat zone (and/or a vaporizer zone) integrated within the device in which reactants are preheated (and/or vaporized) prior to contacting a catalyst. For example, preheating/vaporizing can be conducted by configuring the devices to have reactant channels adjacent to the combustion chamber combustion exhaust channel, reforming chamber, methanation zone, and or reformate product channel.

In some preferred embodiments, heat travels via convection and/or conduction along the length of the reforming chamber. The volume of a reforming chamber is defined as the volume containing a packed bed catalyst or catalyst monolith or the volume containing a catalyst and a bulk flow path over the catalyst (such as a wall coating). The length of reforming chamber is the direction of net flow through the reforming chamber volume. Height and width are mutually perpendicular and perpendicular to length. Preferably, the distance of length of the reforming chamber is at least twice, more preferably at least 4 times, the distance of height or width; this enables excellent alcohol conversion at lower temperatures, thus improving thermal efficiency. In some preferred embodiments, a reforming channel contains a reforming catalyst and a methanation catalyst. Configurations in which a reforming catalyst contacts a methanation catalyst can be particularly advantageous because heat can be conducted between the catalysts that operate at similar temperatures.

In addition to, or in place of, the preheat chambers, heat exchangers can be employed to control temperatures of fluids and components in the devices. The direction of flow in the heat exchangers may be either co-current, counter-current, or cross-flow. For some embodiments, this approach can enable excellent heat transfer performance.

The combustion chamber preferably has a volume of 0.05 ml or less; more preferably 0.003 ml or less. In some preferred embodiments, the volume of the combustion chamber is in the range of 0.02 and 0.002 ml. In some embodiments, a reforming chamber in thermal contact with the combustion chamber has dimensions that are similar to, or the same as, the dimensions of the combustion chamber. In some other embodiments, the reforming chamber has a volume of 10 ml or less; more preferably 1 ml or less; in some embodiments 0.05 ml or less. In some preferred embodiments, the volume of the combustion chamber is in the range of 1 and 0.01 ml. In some configurations it is desirable for the reforming chamber to have at least 3 times the volume, more preferably at least 10 times the volume of the combustion chamber. The volume of the combustion chamber is the area where catalyst is present, either as a packed bed, a porous monolith, or a wall coating of a channel through which travels fuel and combustion products.

The overall volume of an integrated microreformer device (including preheat, combustion and reforming chambers, and optional methanation zone) is preferably 20 ml or less, more preferably 1 ml or less, and in some embodiments 0.05 ml or less. In some preferred embodiments, the volume of the integrated microreformer is in the range of 0.01 and 0.2 ml.

Heat loss is a function of surface area—lowering surface area (for the same amount of heat) reduces heat loss and puts thermal energy exactly where it is needed. Therefore, in some preferred designs, surface area is minimized. For example, in some environments, cylindrical reforming and/or combustion channels can perform better than planar geometries.

In cylindrical configurations (such as shown in FIGS. 3, 4, 6 and 7), the combustion and reforming chambers preferably have a diameter of 35 mm or less, more preferably 15 mm or less; and in some preferred embodiments, the diameter is in the range of 0.74 to 5.0 mm. In layered configurations (such as shown in FIGS. 1 and 2), the combustion layer preferably has a height (in the embodiment shown in FIGS. 1 and 2, height is the distance between the reformer layer and the combustor fuel layer including one half of the thickness of the two separator plates) of 1 mm or less, more preferably 0.6 mm or less; and in some preferred embodiments, the thickness is in the range of 0.4 to 0.1 mm.

The invention also enables the economical manufacture of arrays of microcomponent devices incorporating hundreds or thousands or more of microcombustors (optionally interleaved or nested with alternating components such as microreformers or heat exchangers). Devices having the described performance characteristics can be relatively large devices with numerous repeating units; however, in some preferred embodiments, the characteristics (see the following section) are obtained in single, nonrepeating units that are not part of larger repeating unit devices such as plate reformers.

A complete compact power system can be constructed with liquid and gas delivery systems, valves, microbattery for start-up, packaging and integration with a fuel cell. For example, passive liquid delivery systems (0.03 ml/hr–0.5 ml/hr), gas delivery systems (5 sccm–50 sccm) valves, and appropriate controls can be provided. The system can also be operated passively, from a start-up time or after an initial expenditure of energy to begin the process.

In preferred embodiments, the integrated combustor/reformer does not contain any $H_2$-selective membranes to filter a gas (for example, no Pd membranes), and/or does not contain any preferential oxidation catalyst or oxygen inlets so that no reformate product stream is preferentially oxidized.

Combustor/Reformer: System Properties

A significant advantage of the present invention is the ability to provide microcombustors and microreformers, possessing desirable performance capability, in sizes that have been heretofore unobtainable. Surprisingly, in methods and devices of the present invention, these small sizes can be accompanied by self-sustaining or better performance. The various combinations of size, flow rates, performance, and other variables discussed herein are preferred characteristics that can be used to describe the present invention. The characteristics described in the Operating Conditions section and the following levels of conversions and/or selectivities and/or thermal gradients and/or thermal efficiencies and/or stabilities are characteristics of some preferred inventive methods. These levels are also characteristic of apparatus when it is tested under the following conditions: when $H_2O$ and methanol in a 1.2:1 molar ratio are feed into the reforming chamber with a contact time of 1.0 second, and fuel and oxygen are combusted in the combustion chamber at a rate sufficient to obtain an average temperature of 320° C. within the combustion chamber. Preferably, in this test, hydrogen and air are combusted with a feed ratio comprising a $H_2:O_2$ ratio of 0.5.

Alcohol conversion in the reforming channel is preferably at least 50%, more preferably at least 80% and still more preferably at least 90%, and yet more preferably at least 98%. Hydrogen selectivity, defined as moles H atoms in $H_2$ in the product gas divided by moles H in all product gases, is preferably at least 50%, more preferably at least 60%, still more preferably at least 85%. $H_2$:CO ratio in the product stream is preferably at least 70, more preferably at least 100; and still more preferably at least 10,000, and in some embodiments in the range of 100 to 100,000.

In the combustion chamber, fuel conversion (as measured by gas chromatography of the exhaust gas) is preferably at least 70%, more preferably at least 80%, and still more preferably at least 90% and still more preferably at least 98%. Carbon dioxide selectivity, defined as moles $CO_2$ in the exhaust gas divided by of all carbon-and-oxygen-containing product gases, is preferably at least 50%, more preferably at least 70%, still more preferably at least 85%. Conversions higher than 99% and close to 100% for fuels to both the combustor and for the reformer has been attained.

In some embodiments, the reforming chamber is hottest at one end, and gets cooler along its length. In some preferred embodiments, the temperature at one end of the length of a reforming chamber is within 20° C. of the temperature of the combustion chamber, and that hot end is at least 10° C. higher than the average temperature of the reforming catalyst.

Thermal efficiency is preferably at least 5%, more preferably at least 10% and still more preferably at least about 20%, and in some embodiments 10 to about 35%, in some embodiments 15 to 25%.

The systems preferably are stable such that conversion and/or thermal efficiency decreases by 5% or less after 100 hours of continuous operation, and, preferably, degrades by 5% or less after 5 thermal cycles. Whether a system "degrades" can be defined (and measured) using any of the properties and characteristics discussed herein, for example, alcohol conversion, $H_2$ production, and/or CO levels.

Catalysts

In an integrated system, the combustion catalyst can be any known combustion catalyst. Typical for the devices described in the examples was 5% Pt on alumina wash coated onto a FeCrAlY felt.

Catalyst compositions suitable for alcohol steam reforming include CuZnAl, Pd/ZnO, and supported Ru, Pt, and Rh catalysts. Pd/ZnO catalysts are preferred since they are not pyrophoric and can possess excellent performance properties. In preferred embodiments, the steam reforming catalyst is characterizable as having a $H_2$ productivity of at least 100 Nm3/kg·Pd/h at 240° C. and/or a methanol conversion of at least 70% and a CO selectivity of 2% or less at 260 C. These performance properties are to be measured as described in the quartz tube testing procedures of the Examples section.

In some preferred embodiments, when 0.19 g of the catalyst is packed in a 4 mm inner diameter quartz tube and heated to 260° C., and a 1:1 weight ratio solution of methanol and water are feed into the tube at a liquid flow rate of 2 ml/h, vaporized and passed through the catalyst, the catalyst has a characteristic activity such that it possesses one or more of the following characteristics: at least 70% of the methanol is converted to products and the selectivity to CO is 2% or less; 5; 70% to about 90% of the methanol is converted to products; the product stream contains less than 1 volume percent CO; the product stream contains 0.3 to about 0.8 volume percent CO; the $H_2$ productivity is at least 100 $Nm^3$/kg Pd/h; the $H_2$ productivity is at least 200 $Nm^3$/kg Pd/h; and/or the $H_2$ productivity is 150 to about 280 $Nm^3$/kg Pd/h.

In preferred embodiments, Pd/ZnO is dispersed on a support, preferably a metal oxide support. Alumina is a particularly desirable support because of its low cost, high surface area, and good interaction with Pd/ZnO. In some preferred embodiments, the catalyst contains 2 to 12 weight % Pd (including the weight of the support, typically a metal oxide, upon which the Pd/ZnO is dispersed, but not including any underlying material such as a metal felt or foam), and in some embodiments 5 to 12 wt %, and in some embodiments 7 to 10 weight % Pd. In some preferred embodiments, the steam reforming catalyst has a Pd:Zn molar ratio of 0.1 to 0.8, more preferably 0.2 to 0.5, and still more preferably 0.25 to 0.4. In some preferred embodiments, a Pd/Zn catalyst is prepared by co-precipitating Pd and Zn; these components may be coprecipitated using inorganic or organometallic precursors. Prior to steam reforming, the steam reforming catalyst is advantageously subjected to an activation treatment, preferably reduction at 300–400° C.

The invention also provides a method of making superior catalysts that have high metal loadings and high levels of Zn that is coprecipitated with Pd. In this method, an aqueous solution that includes zinc nitrate is heated. This heating step increases the concentration of zinc in excess of the concentration that would be dissolved at room temperature. Then, Pd and Zn in an aqueous solution are coprecipitated on an oxide support. In some preferred embodiments, the aqueous solution comprising zinc nitrate is heated to at least 50° C.

Figure 14:
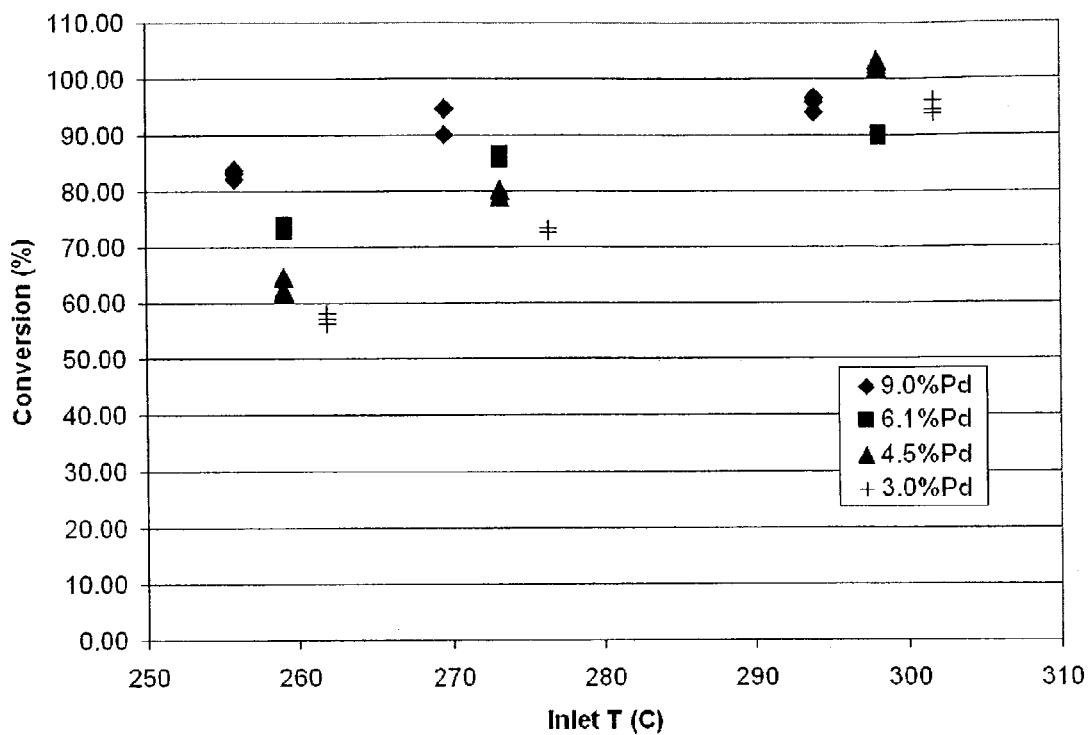
FIG. 14 is a data plot of methanol conversion versus temperature for a series of catalysts with varying weight percent Pd. This data was collected from methanol steam reforming at 260° C. over alumina supported catalysts each having a 0.5 ratio of Pd:ZnO.
Figure 15:
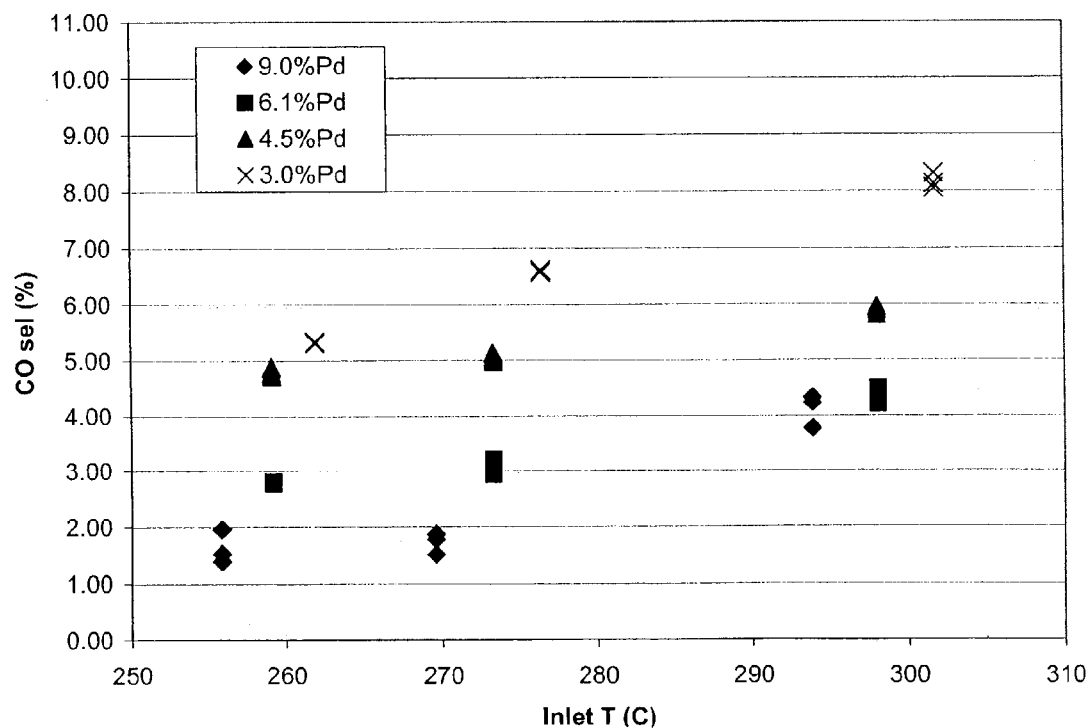
FIG. 15 is a data plot of CO selectivity versus temperature for a series of catalysts with varying weight percent Pd. This data was collected from methanol steam reforming at 260° C. over alumina supported catalysts each having a 0.5 ratio of Pd:ZnO.
Figure 16:
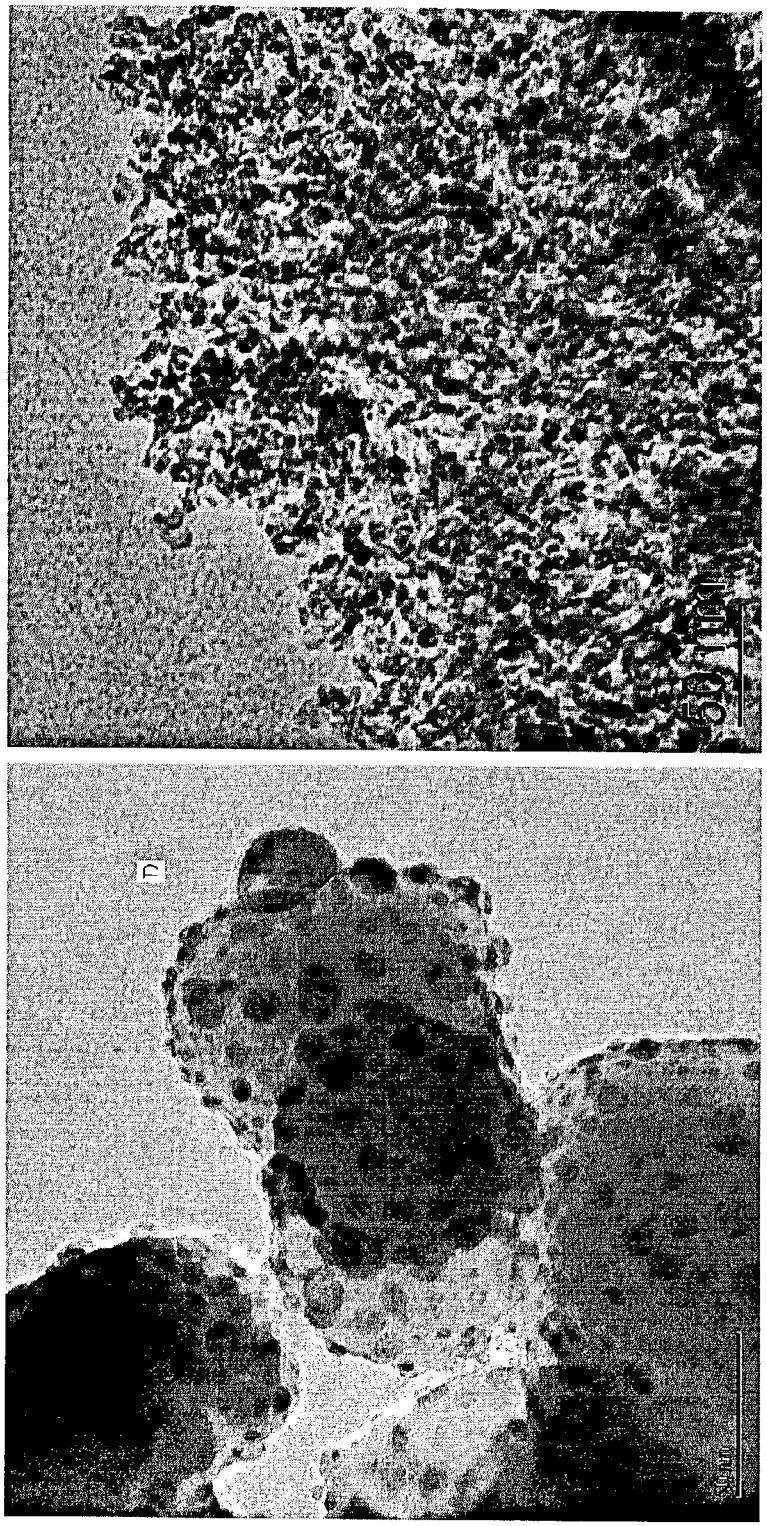
FIG. 16 shows tranmission electron microscope (TEM) photomicrographs. The photomicrograph on the right is an inventive catalyst and it shows a Pd particulate size of about 4 nm which is about half that of the Pd on ZnO catalyst shown on the left.

Testing of Pd/ZnO/Al$_2$O$_3$ catalysts with a Pd/Zn ratio of 0.5 was conducted at varying metal loadings using methanol and steam in a steam to carbon ratio of 1.8. The results are shown in FIGS. 14 and 15. As expected, methanol conversion increased with increasing metals loading. Also, CO selectivity decreased with increasing metals loading up to 9% Pd.

In some embodiments, methanation catalysts for use in the present invention can be any of the known methanation catalysts. In preferred embodiments, the methanation catalyst has ruthenium distributed on the surface of an alumina support, in some preferred embodiments Ru is present in a range of 2 to 4%. In some preferred embodiments, the weight ratio of Ru to alumina is at least 0.03, and in some embodiments, 0.03 to 0.1. In some particularly preferred embodiments, a Ru/Al$_2$O$_3$ catalyst is disposed over the surface of a porous support such as a felt.

The function of the methanation catalyst is to reduce CO in the output of the reformer. Therefore, the methanation catalyst should be disposed so that CO produced in the reforming reaction can be converted to methane. Because methanation catalysts can operate at temperatures that are similar to or the same as reforming catalysts, the methanation catalyst can be disposed in contact with the reforming catalyst, either adjacent or mixed with a reforming catalyst. If it is mixed, this mixing should preferably be in the downstream portion of the reforming catalyst so that methanation of methanol doesn't occur.

Particularly useful for any of the combustion, reforming and/or methanation catalysts are catalysts having very high porosity, for example, at least about 80%, and large pore sizes, for example, up to 200 μm, so as to facilitate a high mass transfer at low pressure differential. Such catalyst is a preferred way to maintain a small-size reactor. A very high activity catalyst is not required, but high activity catalysts can be used, which can result in smaller devices with larger processing rates.

The catalysts may take any conventional form such as a powder or pellet. In some preferred configurations, a catalyst includes an underlying large pore support. Examples of preferred large pore supports include commercially available metal foams and, more preferably, metal felts. The large pore support has a porosity of at least 5%, more preferably 30 to 99%, and still more preferably 70 to 98%. Preferably, the support has a volumetric average pore size, as measured by BET, of 0.1 μm or greater, more preferably between 1 and 500 μm. Preferred forms of porous supports are foams and felts and these are preferably made of a thermally stable and conductive material, preferably a metal such as stainless steel or FeCrAlY alloy. These porous supports can be thin, such as between 0.1 and 1 mm. Foams are continuous structures with continuous walls defining pores throughout the structure. Felts are fibers with interstitial spaces between fibers and includes tangled strands like steel wool. Various supports and support configurations are described in U.S. patent application Ser. No. 09/640,903 (filed Aug. 16, 2000), which is incorporated by reference.

A catalyst with a large pore support preferably has a pore volume of 5 to 98%, more preferably 30 to 95% of the total porous material's volume. Preferably, at least 20% (more preferably at least 50%) of the material's pore volume is composed of pores in the size (diameter) range of 0.1 to 300 microns, more preferably 0.3 to 200 microns, and still more preferably 1 to 100 microns. Pore volume and pore size distribution are measured by mercury porisimetry (assuming cylindrical geometry of the pores) and nitrogen adsorption. As is known, mercury porisimetry and nitrogen adsorption are complementary techniques with mercury porisimetry being more accurate for measuring large pore sizes (larger than 30 nm) and nitrogen adsorption more accurate for small pores (less than 50 nm). Pore sizes in the range of about 0.1 to 300 microns enable molecules to diffuse molecularly through the materials under most gas phase catalysis conditions.

In preferred embodiments, the surface active sites of a catalyst are dispersed on a (preferably high surface area, BET surface area>10 m$^2$/g) metal oxide support. Preferred metal oxides include ZnO, ZrO$_2$, and Al$_2$O$_3$. The metal oxide, including the presence of catalytically active surface sites, as measured by BET, preferably has a volumetric average pore size of less than 0.1 micrometer (μm). The metal oxide, including the presence of catalytically active surface sites, as measured by BET, nitrogen physisorption, preferably has a surface area of more than 10 m$^2$/g, more preferably a surface area of 20 to 500 m$^2$/g. The metal oxide can be particles, preferably having diameters less than 100 μm, more preferably less than 10 μm, or, more preferably, forms a layer (of agglomerated particles or a continuous film) having a thickness less than 100 μm, more preferably less than 50 μm, and still more preferably a thickness of less than 10 μm.

When an underlying, large-pore substrate is used, a powder can be slurry coated over the substrate at any stage in the preparative process. For example, a high surface area metal oxide could be slurry coated onto the substrate followed by depositing, drying and activating a metal via the impregnation method. Alternatively, a vapor coat or soluble form of alumina (or other high surface area material) could be applied onto the substrate. Although solution or slurry coating is typically less expensive, vapor coating of the various materials could also be employed.

Porous catalysts can be prepared, for example, by washcoating on a FeCrAlY felt (obtained from Technetics, Deland, Fla.) where the felt is sized to have a 0.01" (0.25 mm) thickness and 90% porosity. In some embodiments, the mass of wash coat may be in the order of 0.1 gram catalyst per square inch (6.5 cm$^2$) of felt. Coatings can also be applied to other types of structured substrates like metal foams made of stainless steel, copper, alloys, etc. In one preferred embodiment, the large-pore substrate has a corrugated shape that could be placed in a reaction chamber (preferably a small channel) of a steam reformer.

In the illustrated devices, the catalysts are porous, flow-through catalysts in which flow proceeds chiefly through the catalyst structure. In some alternative embodiments, the catalyst can be placed on an inner wall or on inner walls of the reaction chamber with an open channel from the reactor inlet to the outlet—this configuration is called "flow-by." In other alternative embodiments, the catalyst can be packed in the flow path.

Preferred embodiments of the inventive microreformers and methods may also be described in terms of the exceptionally high specific activity of the catalysts. Preferably, the catalyst and/or method has a specific activity of greater than 1.5, more preferably greater than 2.5 mol methanol converted/(g catalyst)(hr) when tested at 400° C., 25 msec contact time, 1.8 steam-to-carbon (i.e., water:methanol) ratio; and the catalyst systems exhibiting this specific activity preferably has a pressure drop of less than 25 psig.

Operating Conditions

Operation of a microreformer according to the present invention will now be described. An exemplary start-up procedure begins at room temperature with slow flow of $H_2$ gas (0.2–0.5 sccm) and low flow of air 5–8 sccm. After light-off, hydrogen flow is increased until reactor temperature is >70° C. (usually around 1–1.5 sccm $H_2$). Fuel flow to combustor can be initiated at this point. Once the fuel (preferably methanol) has begun reacting (the combustor temperature will increase substantially), the hydrogen flow is tapered off and the fuel flow is increased. A minimum of 10% excess air was maintained to ensure that the combustion catalyst was able to convert 100% of the fuel. The excess air should not be too much (preferably below 200%), since the extra air removes heat from the steam reformer. Air and methanol flows are adjusted until the steam reformer is at the desired temperature or 10–20° C. greater. The reformer fuel mixture flow is initiated at this point. Combustor flows are adjusted as necessary to maintain desired temperatures.

Steam reforming is a process in which hydrogen is stripped from a hydrocarbon fuel by thermal energy provided by a combustor. The process can be represented by the chemical equation:

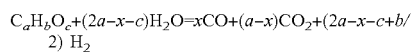

In alcohol steam reforming, the feed stream contains steam and an alcohol or alcohols. In the present invention, methanol, ethanol, and propanol are preferred with methanol being especially preferred. The reformer mixture molar ratios are preferably between 1–6 steam:carbon, and more preferably between 1.5–3 steam:carbon. In a particularly preferred embodiment, the feed stream into the reforming chamber comprises methanol and water in a ratio of 1:1 to 1:3. The flow rate of reactants will depend on the desired amount of $H_2$ to be produced and on the minimum or maximum capacity of the steam reformer. In some preferred embodiments of the present invention, the steam reformer fuel mixture flow rates are preferably between 0.005 and 1.0 ml/hr and more preferably between 0.05 and 0.2 ml/hr, where volume is volume of the alcohol and water at room temperature.

The rate of combustion can be controlled to provide the desired amount of heat to a steam reforming reaction in an adjacent reforming chamber. In some preferred embodiments of the present invention, the fuel (preferably methanol) and air flow rates to the combustor are preferably 0.01 to 5 ml/hr, where volume is volume of the fuel at room temperature, and 1–50 sccm, respectively and more preferably 0.1 to 0.5 ml/hr and 5–15 sccm respectively.

The steam reforming reaction can be run over a broad pressure range from sub-ambient to very high. The alcohol steam reforming reaction is preferably carried out at 200–400° C., more preferably 220–300° C., and in some embodiments 240–270° C. In some preferred configurations, the combustion temperature is approximately the same (that is, within 20° C.) as the average reformer temperature (that is, the average temperature of the reforming catalyst). The pressures are preferably between 0 and 10 psig and more preferably between 0 and 2 psig for both the combustor and the reformer. In some preferred embodiments, contact time (based on steam reforming catalyst) of the reforming process stream is less than 2 seconds, in some embodiments 1 second or less, and in some embodiments, in the range of 100 ms to 500 ms.

The reformate stream usually comprises hydrogen, carbon dioxide, and carbon monoxide. PEM fuel cells operate have a very low tolerance for CO. They can generally tolerate carbon dioxide and some other gases such as nitrogen, but only up to a certain amount. Clean-up of a reformate stream can be performed, for example by a multi-step process consisting of water gas shift reactors, combined with selective oxidation and/or carbon monoxide methanation, or by the use of a hydrogen permeable membrane, as disclosed in Pietrogrande et al., "fuel processing," *Fuel Cell Systems*, Chap. 4, Blomen, LJMJ and MN Mugerwa, pp. 121–151, Plenum Press, New York, 1993.

We have surprisingly discovered that, in an inventive method, excellent results can be obtained by directly methanating a reformate stream without first passing the reformate through a hydrogen-selective membrane, preferential oxidation, or water gas shift reactor. This is highly desirable since hydrogen-selective membranes are expensive, and additional process steps can be costly and result in lowered yield. Eliminating the requirement of a preferential oxidation also eliminates the need to add oxygen (for example, eliminates the need for added air), including the need to vary oxygen content to account for fluctuations in CO concentration. In preferred embodiments, the process adds heat to the steam reforming step but does not have additional heat exchangers or heat exchange steps for methanation or for other CO-reducing steps.

The methanation reaction is preferably conducted at below 290° C., preferably in the range of 220 to 270° C., more preferably 230 to 260° C., where these temperatures refer to the average temperature of a methanation catalyst (in a device) during operation. Temperature of the methanation catalyst is inversely related to contact time. Contact time for the methanation reaction is preferably less than 2 seconds, more preferably in the range of 200 to 800 ms. When the methanation catalyst is mixed with or adjacent to a reforming catalyst, it is most desirable for the temperature of the methanation reaction to be similar to the temperature of the reforming reaction, preferably the average temperature of these reactions is 50° C. or less, more preferably 30° C. or less, and still more preferably 20° C. or less.

In another alternative, a reforming channel may contain a reforming zone, a water-gas shift reaction zone (preferably operating at 220 to 270° C.), and a methanation zone. In this method also, heat can be transferred along the length of the reforming channel; the reforming zone (the portion of the channel containing reforming catalyst) is nearest the combustion chamber, then the water-gas shift zone, and then the methanation zone. Heat generated by the water gas shift reaction can preheat (and can vaporize) a feed stream.

The following descriptions of the product stream can be measured after steam reforming alone, or steam reforming and methanation reactions. The product stream preferably contains at least 20 sccm $H_2$ per cc of steam reformer volume, more preferably at least 200 sccm $H_2$ per cc of steam reformer chamber volume, in some preferred embodiments between 20 and 5000 sccm $H_2$ per cc of steam reformer chamber volume, and in some embodiments between 20 and 500 sccm $H_2$ per cc of steam reformer chamber volume. Alternatively, the product stream preferably contains at least 1 sccm $H_2$ per cc of device volume, more preferably at least 5 sccm $H_2$ per cc of device volume, still more preferably at least 10 sccm $H_2$ per cc of device volume, and in some preferred embodiments between 6 and about 15 sccm $H_2$ per cc of device volume. In some preferred embodiments, an integrated combustor/reformer produces 0.5 sccm to 5.0 sccm of $H_2$. In preferred embodiments, more than 80%, more preferably more than 95%, and still more preferably more than 98% of the alcohol in the fed is converted to products, and the product stream comprises less than 1.0 volume % CO, more preferably 300 ppm or less, still more preferably less than 100 ppm, and in some embodiments, about 10 ppm to 90 ppm CO. The product stream preferably has a $H_2$:CO ratio of at least 70, more preferably at least 100.

Additional operations can be added to improve performance. For example, unreacted hydrogen from a fuel cell and/or methane from the methanation reaction can be recycled into the combustor.

EXAMPLES

Example 1

An integrated fuel processor system composed of two vaporizers/preheaters, a reformer, catalytic combustor, and heat exchanger was built and tested. For each of these designs the manufacture and assembly were performed in the same fashion. Metal pieces were cut and machined from standard stainless steel stock. Ceramic pieces were formed and machined using standard ceramics molding and shaping techniques. Tubing and fittings were cut to fit as required.

The following example is for a device such as illustrated in FIG. 3. For preassembly, all of the tubing, catalyst pieces, and respective reactor parts were cut per specifications. Plungers were joined to tubing using standard, high-temperature adhesives. In the alternative, high-temperature soldering could be used for some or all joins. All tubing and the plunger assemblies were inserted through the end-caps or end-seals and set to their appropriate positions for final assembly.

The first step in the assembly process was to insert the catalyst pieces into their respective chambers, and then attach the end-caps or seals such that the plunger bodies were pressed tightly against their respective catalysts. In the second step, the end-caps were then attached permanently to the reactor body by applying high-temperature adhesive or by high-temperature soldering.

Catalytic combustion was used to provide heat for liquid vaporization, gas preheating, and to provide the necessary energy for the reforming reaction or reactions. The reformer had a volume of 2.5 mm$^3$ and a capacity of 200 mW$_t$. The combustor volume was 2.5 mm$^3$ and had a capacity of up to 3 W$_t$. The combustor capacity was oversized in order to allow a wide range of operating conditions to be examined. The combustor fuel consisted of hydrogen and methanol. A thermal couple was inserted into the combustor to monitor the device temperature. The system was mounted inside a larger tube for testing.

The test stand consisted of syringe pumps, gas controllers, vapor liquid separations units, and an online gas chromatograph. Syringe pumps fed the methanol/water mixture to the reformer at rates of 0.02 cc/hr to 0.1 cc/hr (20° C. basis), and pure methanol to the combustor at rates between 0.1 cc/hr to 0.4 cc/hr (20° C. basis). Air was fed to the combustor at rates between 8 and 20 sccm. The product reformats gases were fed, via a dri-rite tube to eliminate any residual water vapor, to an on-line micro gas chromatograph (Agilent QuadH).

The use of electric heating for system start-up was eliminated by following the subsequent procedure. Hydrogen and air were fed to combustor to initiate combustion and heat the vaporizers. Once the vaporizers were heated to approximately 80° C., methanol was fed to the vaporizer. The hydrogen was slowly tapered off as the methanol feed was increased until only methanol and air were being fed to the combustor and the device was completely self-sustaining. The methanol/air mixture was adjusted until the steam reformer reached the desired temperatures (250° C.–450° C.) depending on the conditions being tested. The methanol/water solution feed was then initiated.

The reformer was operated over a wide range of conditions. In order to achieve 90% conversion, 425° C. operating temperatures in the combustor were required. Two hundred mW$_t$ power was achieved with a thermal efficiency of 10%. A 1/10,000 inch (2.5 μm) diameter thermocouple that was used to measure temperature was a major source of heat loss through the thermocouple. The efficiency could be substantially improved by removing the thermocouple and by use of improved insulator materials such as metallized polyimide (that reflects heat), and it is believed that with these improvements the inventive devices can be 25% thermally efficient.

With a catalyst composed of Pd on ZnO, the reformate stream was composed primarily of hydrogen (>73%), with approximately 26% carbon dioxide and 1% carbon monoxide constituting the rest of the components.

The anticipated electrical power from a fuel cell powered by this stream can be found by multiplying the thermal power by the net fuel cell efficiency. Typical fuel cells operate at 60% efficiency and utilize 80–85% of the $H_2$ in a reformate stream for a net efficiency of about 50%. Thus, a fuel cell utilizing the reformate from this device could provide on the order of 100 mW$_e$ and the system (reformer+fuel cell) would have a net (fuel processor+fuel cell) efficiency of about 4.5%. As the reformer output was decreased, the efficiency also decreased. For example when the reformer produced 70 mW$_t$ (about 35 mW$_e$) the efficiency decreased to 3% (about 1.5% net). The efficiency decreased because the thermal losses as a percent of the total amount of power fed to the device increases as the size is reduced.

The data in the following table was acquired using the experimental procedure described above. The gas composition was determined using the Agilent MicroQuad GC, the gas flow rates were determined using a bubble meter (measure the time it takes for a bubble to move through known volume which in this case was 0.2 cc). The gas flow rate was determined when ambient temperature was 19.5° C., thus to standardize it (gas flow at 0° C.), the flow rate was divided by 292.5K (19.5° C.) and multiplied by 273K (0° C.). This results are in sccm or standard cubic centimeters per minute. The methanol conversion was calculated by using a carbon balance on the system. (e.g., the amount of carbon fed to the reformer is known, and the amount of carbon in the gas can be calculated from the amount of CO, $CO_2$, and methane formed. Dividing the two numbers gives the methanol conversion). The data has about a 5% standard deviation.

| Cntct Time mSec | Approx SR Temp, °C. | Exit Flow ccm | Methanol Conversn | $H_2$ flow sccm | $H_2$/SR rctr vol scc/(min*cc) | $H_2$/device vol scc/(min*cc) | Thermal Pwr mW | Effncy % |
|---|---|---|---|---|---|---|---|---|
| 133 | 398 | 0.714 | 1.047 | 0.45 | 206 | 4.49 | 80.7 | 6.5 |
| 133 | 398 | 0.698 | 0.999 | 0.43 | 197 | 4.28 | 76.9 | 6.2 |
| 86 | 419 | 1.092 | 1.021 | 0.69 | 318 | 6.91 | 124.3 | 8.4 |
| 50 | 421 | 1.202 | 0.628 | 0.75 | 346 | 7.53 | 135.5 | 8.5 |
| 50 | 450 | 1.604 | 0.857 | 1.02 | 468 | 10.17 | 182.9 | 9.8 |
| 50 | 450 | 1.493 | 0.796 | 0.94 | 434 | 9.44 | 169.8 | 9.1 |
| 50 | 470 | 1.644 | 0.888 | 1.05 | 483 | 10.52 | 189.1 | 9.5 |
| 50 | 470 | 1.671 | 0.903 | 1.07 | 491 | 10.69 | 192.2 | 9.7 |
| 50 | 470 | 1.671 | 0.901 | 1.07 | 491 | 10.68 | 192.0 | 9.7 |
| 112 | 362 | 0.802 | 0.766 | 0.33 | 153 | 3.33 | 59.8 | 5.0 |
| 112 | 363 | 0.893 | 0.880 | 0.39 | 180 | 3.92 | 70.5 | 5.9 |
| 112 | 361 | 0.875 | 0.923 | 0.39 | 181 | 3.94 | 70.9 | 5.9 |
| 133 | 369 | 0.677 | 0.938 | 0.34 | 158 | 3.43 | 61.7 | 5.5 |
| 133 | 370 | 0.711 | 0.958 | 0.33 | 150 | 3.26 | 58.6 | 5.2 |
| 133 | 370 | 0.656 | 0.890 | 0.28 | 129 | 2.81 | 50.4 | 4.5 |
| 86 | 371 | 0.896 | 0.752 | 0.40 | 182 | 3.95 | 71.1 | 6.0 |
| 86 | 372 | 0.951 | 0.792 | 0.38 | 174 | 3.78 | 67.9 | 5.8 |
| 86 | 372 | 0.929 | 0.771 | 0.34 | 156 | 3.40 | 61.1 | 5.2 |
| 86 | 400 | 0.798 | 0.698 | 0.28 | 129 | 2.80 | 50.3 | 3.9 |

Example 2

The device illustrated in FIG. 7 was fabricated similarly to the descriptions in Example 1. The combustion catalyst was Pt on alumina that was coated onto a FeCrAlY felt support. On the reforming side of the device, a porous reforming catalyst felt was inserted into the channel. The diameter of the felt (0.26 inch, 0.66 cm) was the same as the inner diameter of the cylinder. Then, a porous plunger (having a center hole through the center with an inlet tube through the hole) was pressed onto the catalyst felt. In this case, the porous plunger was also a porous reforming catalyst felt. Prior to insertion, a laser was used to form a hole in the center of the porous plunger. Alternative techniques such as punching a hole through a felt prior to depositing a catalyst coating may alternatively be used. The reforming catalyst felts were prepared by coating a FeCrAlY felt with alumina followed by depositing Pd.

Then, 16 mg of a steam reforming powder catalyst was poured in. This catalyst was prepared by coprecipitating Pd and Zn onto alumina powder. Then, 12 mg of a methanation powder catalyst was added onto the reforming powder catalyst. The methanation catalyst was 3 wt % Ru on alumina. A 0.66 cm diameter methanation catalyst felt was placed over the powder catalysts, and cap was placed to close the tube. The cap was brazed in place. The methanation felt was the methanation powder wash coated onto a felt.

The device was operated under conditions similar to those in Example 1. Operational temperatures in the combustion chamber were 315 to 350° C. and combustor flow rates were 6 to 9 cc/min with higher temperatures corresponding to higher flow rates. A mixture of hydrogen and air were feed to the combustion chamber at an hydrogen:oxygen ratio of 0.45 to 0.6. For testing in which only steam reforming powder catalyst was present (no methanation catalyst), combustor temperature ranged from 240 to 285° C. at flow rates of 4.8 to 7.1 cc/min. These flow rates are at room temperature. Start-up procedures were the same as in Example 1 except using lower temperatures. Test of the device with contact times (based on steam reforming catalyst) of 1.0 second and 1.5 seconds resulted in product streams containing 0.3 vol % and 0.02 vol % (200 ppm).

Methanol and water were fed into the reforming chamber at a 1.2:1 ratio.

Pressure drop through the combustion and reforming sides was very low, in the range of 1–15 psig (pounds per square inch), usually less than 1 to 2 psig.

Figure 13:
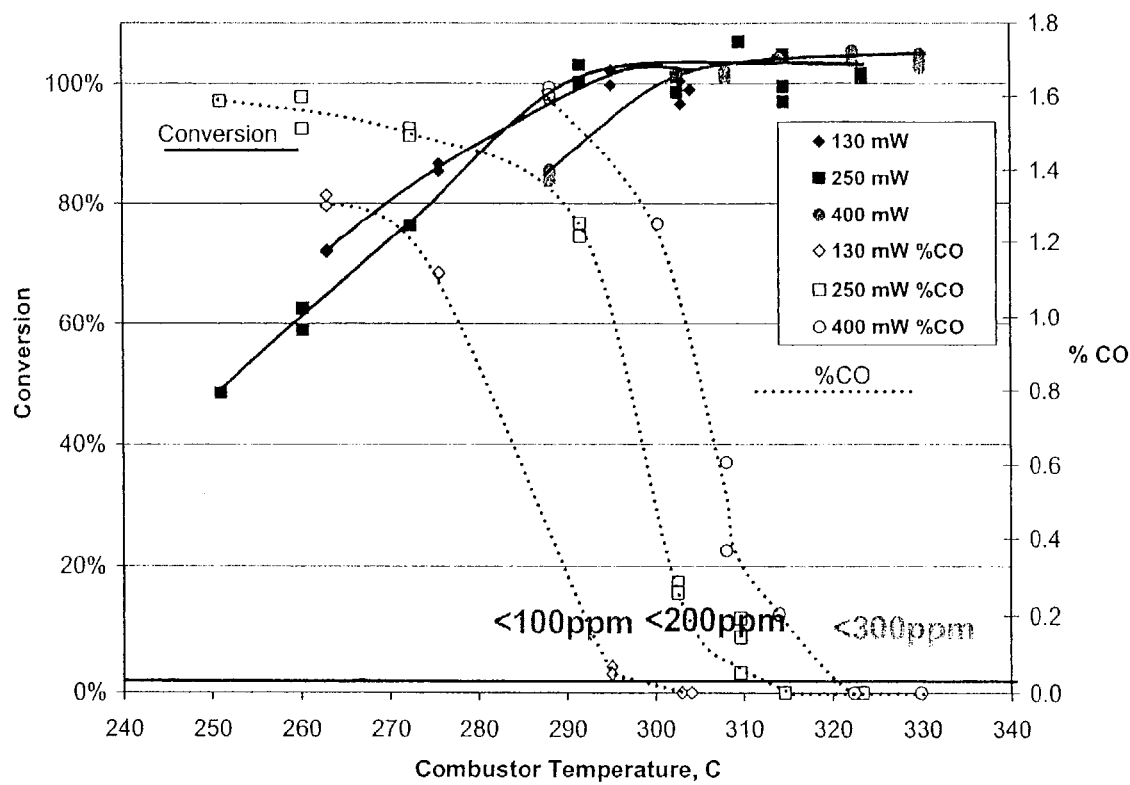
FIG. 13 is a data plot of methanol conversion and mol % CO in the product stream at flow rates corresponding to 130, 250, and 400 mW$_t$ in the device of FIG. 7, as described in Example 2.

The reactor produced over 13 sccm hydrogen per $cm^3$ of total processor volume (includes combustion chamber, steam reforming chamber, methanation zones, heat exchangers and vaporizers) or 28 sccm hydrogen per $cm^3$ steam reforming chamber volume (which in this case was the volume of steam reforming catalyst). The carbon monoxide content in the product stream exiting the device was less than 300 ppm and in most instances less than 100 ppm. We have shown in simple tube test device that CO concentrations of less than 10 ppm can be achieved. A plot of methanol conversion and mol % CO in the product stream at flow rates corresponding to 130, 250, and 400 $mW_t$ is shown in FIG. 13. The thermal efficiency ranged from 8% to over 18% efficient. This efficiency was lower than when operating without the methanation catalyst (chamber filled solely with steam reforming catalyst). This was due to higher operating temperatures and hydrogen loss to methane and water production. The device exhibited excellent stability, running for more than 65 hours, including 11 thermal cycles, without degradation of performance.

In testing in the same type of device without methanation catalyst, the hydrogen production per volume was the same; however, the efficiency was much higher—up to about 33%. However, the CO output was higher—about 1% compared to 300 ppm in the device with the methanation catalyst. The typical volume percent CO for the reactor at lower flowrates (e.g. at inlet flow of 0.15 cc/hr—was 0.5–0.6%, compared to 0.9–1.0% at a flowrate of 0.2 cc/hr; it is believed that the higher CO was due to the higher temperatures.

Catalyst Testing in Fixed Bed Testing Apparatus

Figure 8:
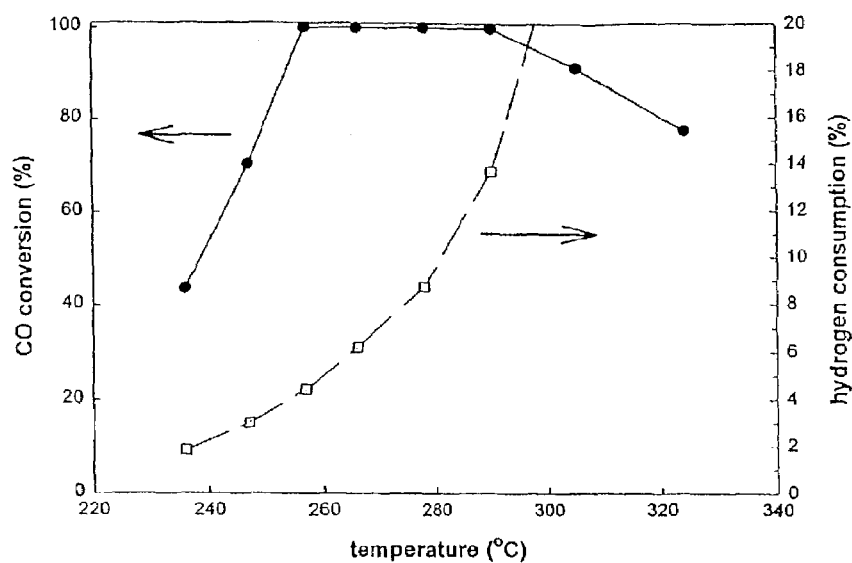
FIG. 8 is a data plot of the conversion of CO and consumption of hydrogen over 3% Ru/alumina (catalyst 0.15 g, 115 cc/min of 75% $H_2$, 24% $CO_2$, 0.9% CO plus 3.8 cc/hr $H_2O$.
Figure 9:
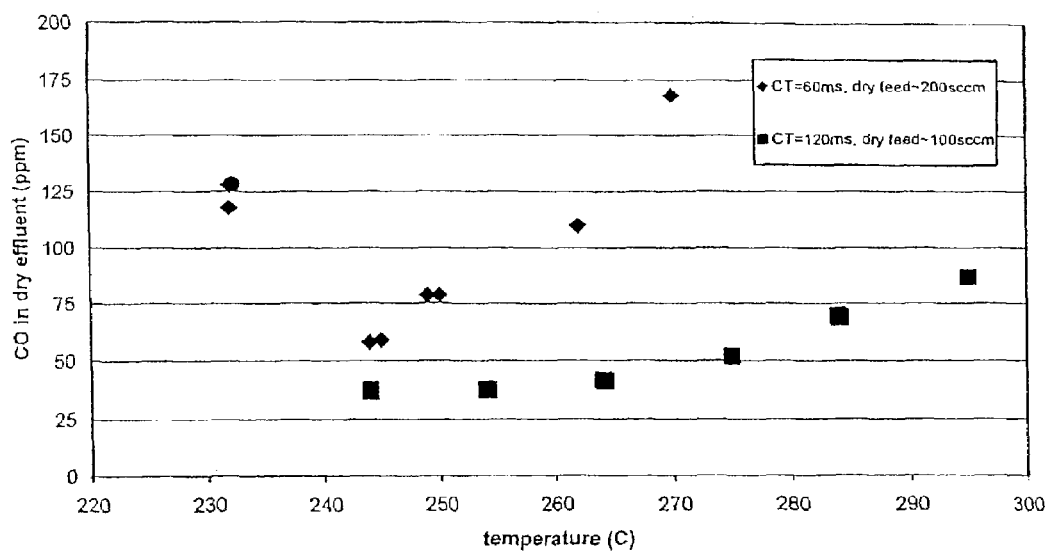
FIG. 9 is a data plot of CO methanation as a function of time over 0.2 g of 3% Ru/alumina catalyst in a packed bed (26 mm height, 4 mm inner diameter) using a feed of 0.6% CO, 15.6% $CO_2$, 43.8% $H_2$, and 40% $H_2O$.

Various methanation catalysts were tested in a fixed bed quartz tube with a 4 mm inner diameter. This testing showed that Ru on alumina (particularly when the ratio of Ru:alumina was 0.03 or greater) exhibited superior performance compared to other catalysts such as 0.5% Ru on zirconia. The results of passing a stream containing 75% $H_2$, 24% $CO_2$, 0.9% CO at a rate of 115 cc/min combined with 3.8 cc/hr of water through a 3% Ru/alumina catalyst are illustrated in FIG. 8. At temperatures higher than 290° C. the reverse water gas shift reaction was forming more CO than was being consumed by methanation. However, below 270° C., the catalyst exhibited excellent selectivity toward CO methanation. FIG. 9 shows the results of methanation over the same catalyst as a function of contact time and temperature. At temperatures in the range of 240–270° C. and a contact time of 120 ms, less than 50 ppm CO was achieved.

Steam Reforming Catalyst Testing

For comparison purposes, a supported Pd—ZnO catalyst was fabricated via the formation of zinc oxide on a γ-alumina support by the precipitation of zinc hydroxide from a zinc nitrate solution with ammonia at pH about 8 and calcination at 350° C., followed by Pd incipient wetness impregnation. The catalysts prepared by this precipitation route are hereafter referred to the baseline catalyst.

Other supported Pd—ZnO catalysts were prepared by a one-step co-impregnation method. In this method, a concentrated palladium nitrate solution (containing about 20 wt % Pd in nitrate acid solution) was mixed with solid $Zn(NO3)_2 \cdot 6H_2O$ at 50 to 80° C. in order to obtain a solution containing Pd and Zn as concentrated as possible. The ZnO/Pd ratio in the resultant solution was varied from 0.7 to 25 in order to obtain the final products having Pd loadings of 1 to 15 wt %. A given support was impregnated at 50 to 80° C. with the amount of solution adjusted according to the pore volume of the support. The wet sample was kept at 60° C. for at least one hour that allowed completing the impregnation process. The samples were dried in air and then calcined at 350° C. for 3 hours. A series of Pd—ZnO/$Al_2O_3$ catalysts with varying Pd loadings using the one-step co-impregnation method have been fabricated. In order to investigate the support effects, $ZrO_2$ and $Ce_2O_3$ supported Pd—ZnO catalysts were also be made.

A typical Pd—ZnO/$Al_2O_3$ using the one-step co-impregnation method for fabricating is described as follows.

1. A mixture containing 13.10 g of $Zn(NO3)_2 \cdot 6H_2O$ and 1.773 g of concentrated Pd nitrate solution (20.19 wt % Pd) was heated at 60° C. in a water bath till the solids dissolved.
2. A 2.00 g of g-$Al_2O_3$ powder with 60–120 mesh (preheated at 500° C. for 2 h) was impregnated with 3.077 g above solution in a glass vial and kept at 60° C. for at least one hour.
3. The wet sample was dried at 100° C. and then calcined at 350° C. at 20° C./min for 2 hours.

The final composition of the catalyst contained 2.6 wt % of Pd, 26 wt % of ZnO, and 70.2 wt % of $Al_2O_3$. Other catalysts were fabricated in similar ways and their compositions are listed in Table 1.

TABLE 1

Composition of supported Pd/ZnO catalysts.

| | | Composition, wt % | | |
|---|---|---|---|---|
| Sample | Description | Pd | ZnO | Support |
| (baseline) | ZnO:Pd = 8, on $Al_2O_3$ | 8.6 | 70 | 21 |
| PdZnAl-10 | ZnO:Pd = 10, on $Al_2O_3$ | 2.6 | 26.4 | 71.0 |
| PdZnAl-4.5 | ZnO:Pd = 4.5, on $Al_2O_3$ | 5.0 | 22.8 | 72.2 |
| PdZnAl-2 | ZnO:Pd = 2.0, on $Al_2O_3$ | 8.9 | 17.8 | 73.3 |
| PdZnAl-1 | ZnO:Pd = 1.0, on $Al_2O_3$ | 12.9 | 13.0 | 74.1 |
| PdZnAl-0.7 | ZnO:Pd = 0.7, on $Al_2O_3$ | 15.7 | 10.9 | 73.4 |
| PdZnZr-10 | ZnO:Pd = 10, on $ZrO_2$ | 1.9 | 19 | 79.1 |
| PdZnCe-10 | ZnO:Pd = 10, on $Ce_2O_3$ | 1.4 | 14 | 84.6 |

The steam reforming catalysts were tested in the fixed-bed quartz tubular reactor with a 4 mm I.D. In each case, the packed catalysts were reduced at a hydrogen-containing gas at 400° C. for 3 hours prior to reaction. The feed liquid consisted of methanol and water at a weight ratio of 1. In most cases, about 0.192 g of the catalyst was packed in the quartz tube and tested at a feed rate of 2 ml/h.

Table 2 list some results for steam reforming of methanol over selected catalysts fabricated according the method described above. The results show that all the examined catalysts, except for the $Ce_2O_3$ supported catalyst, demonstrate the high activity (80% conversion of methanol at below 300° C.) and very low CO selectivity (less 0.8% CO in the dry product steam) while retaining fairly high $H_2$ productivity.

TABLE 2

Reaction results at a 80% of methanol conversion for supported Pd—ZnO.

| | Results at Conversion of 80% | | | |
|---|---|---|---|---|
| Sample | $T_{80}$ [° C.] | Selec. of $CO_2$ % | % CO in Dry Product Stream | $H_2$ Productivity [$Nm^3$/kg cat · h] |
| (baseline) | 297 | 97.7 | 0.52 | 8.2 |
| PdZnZr-10 | 295 | 97.8 | 0.80 | 8.2 |
| PdZnCe-10 | 305 | 86.0 | 3.60 | 2.7 |
| PdZnAl-10 | 275 | 97.8 | 0.58 | 8.9 |
| PdZnAl-4.5 | 265 | 98.3 | 0.42 | 7.3 |
| PdZnAl-2 | 250 | 98.6 | 0.36 | 8.5 |

Figure 10:
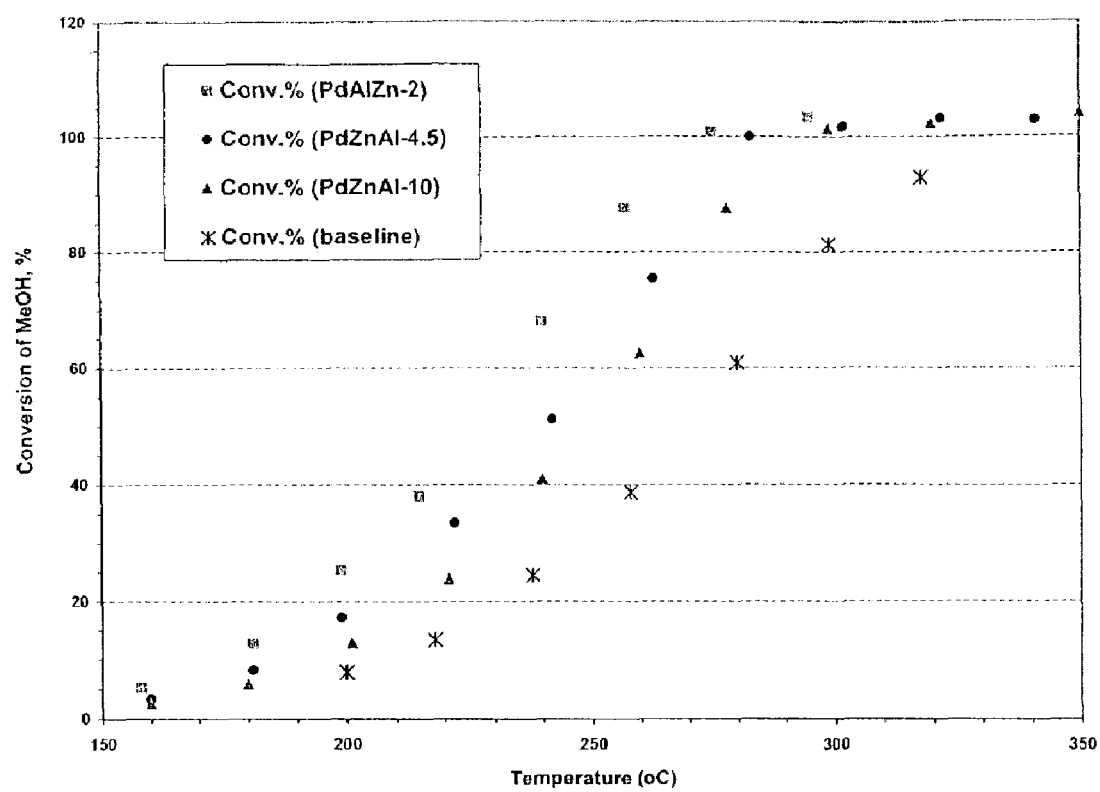
FIG. 10 is a data plot of methanol conversion versus temperature over Pd:ZnO on alumina catalysts.

With a similar amount of Pd content, the catalyst (PdAlZn-2, 8.9 wt % Pd) which was made by the co-impregnation method exhibits much higher activity than that of the baseline catalyst (8.6 wt % Pd), which was synthesized by a precipitation and impregnation process. At the 80% conversion of methanol, the reaction temperature difference is about 50° C. Conversion of methanol over PdAlZn-2, PdZnAl-4.5, PdZnAl-10, and the comparative baseline, as a function of temperature is shown in FIG. 10. As can be seen in the figure, the coprecipitated catalyst exhibits significantly superior activity over a broad range of temperatures.

Figure 11:
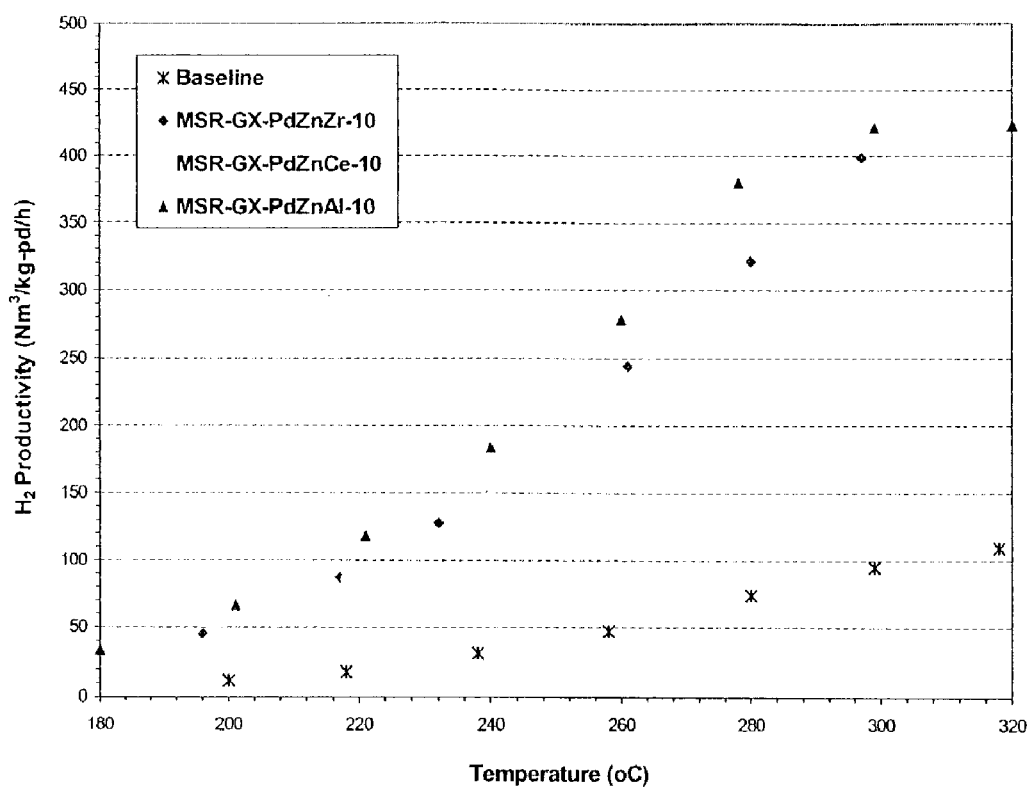
FIG. 11 is a data plot of hydrogen productivity per kilogram Pd versus temperature over various Pd:ZnO supported catalysts.

Furthermore, over the catalysts supported by different substrates, such as $Al_2O_3$, $ZrO_2$, and $Ce_2O_3$ prepared using the coprecipitation method, the $H_2$ productivities of steam reforming of an alcohol (in this case, methanol) are much higher than that of the baseline catalyst. The results are shown in FIG. 11.

Figure 12:
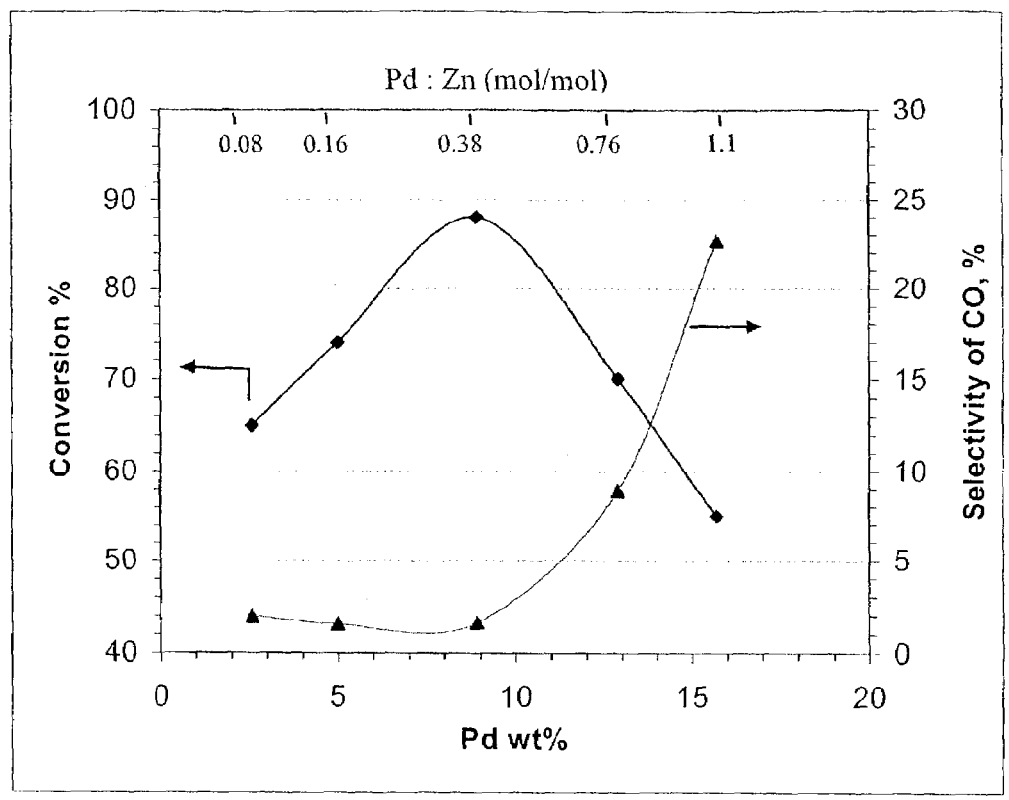
FIG. 12 is a data plot of methanol conversion and CO selectivity versus weight percent Pd and Pd:Zn molar ratio. This data was collected from methanol steam reforming at 260° C. over Pd:ZnO on alumina catalysts.

FIG. 12 shows the conversion of methanol and selectivity to CO at varying Pd loadings (wt %) and Pd to Zn ratios at 260° C. Surprisingly, it was observed that alcohol conversion decreased with increasing Pd levels above about 9% and above a Pd:Zn ratio of about 0.4.

CLOSURE

While preferred embodiments of the present invention have been shown and described, it will be apparent to those skilled in the art that many changes and modifications may be made without departing from the invention in its broader aspects. For example, although devices are shown with one combustor and one reformer, numerous variations such as two combustors sandwiching one reformer, and these variations are included within the scope of the invention. The appended claims are therefore intended to include all such changes and modifications as fall within the true spirit and scope of the invention.

We claim:

1. An alcohol steam reforming catalyst, comprising:
   Pd and Zn in a Pd:Zn molar ratio of 0.1 to about 0.8 dispersed on an oxide support, and
   wherein the catalyst possesses an activity such that methanol conversion is at least 70% and CO selectivity is 2% or less, as measured by a technique wherein 0.19 g of the catalyst is packed in a 4 mm inner diameter quartz tube and heated to 260° C., and a 1:1 weight ratio solution of methanol and water are fed into the tube at a liquid flow rate of 2 ml/h, vaporized and passed through the catalyst.

2. The catalyst of claim 1 comprising 5 to 12 weight % Pd.

3. The catalyst of claim 2 comprising a Pd:Zn molar ratio of 0.25 to 0.4.

4. The catalyst of claim 3 comprising 7 to 10 weight % Pd.

5. The catalyst of claim 4 wherein the catalyst possesses an activity such that methanol conversion is 70% to about 90%, as measured by a technique wherein 0.19 g of the catalyst is packed in a 4 mm inner diameter quartz tube and heated to 260° C., and a 1:1 weight ratio solution of methanol and water are fed into the tube at a liquid flow rate of 2 ml/h, vaporized and passed through the catalyst.

6. The catalyst of claim 5 comprising an alumina support.

7. The catalyst of claim 1 wherein the catalyst possesses an activity such that less than 1 volume percent CO is produced over the catalyst from methanol steam reforming, as measured by a technique wherein 0.19 g of the catalyst is packed in a 4 mm inner diameter quartz tube and heated to 260° C., and a 1:1 weight ratio solution of methanol and water are fed into the tube at a liquid flow rate of 2 ml/h, vaporized and passed through the catalyst.

8. The catalyst of claim 7 wherein the catalyst comprises 5 to 12 weight % Pd.

9. The catalyst of claim 7 comprising 5 to 12 weight % Pd, a Pd:Zn molar ratio of 0.1 to 0.8, and a metal oxide support.

10. The catalyst of claim 1 wherein the catalyst possesses an activity such that 0.3 to about 0.8 volume percent CO is produced over the catalyst during methanol steam reforming, as measured by a technique wherein 0.19 g of the catalyst is packed in a 4 mm inner diameter quartz tube and heated to 260° C., and a 1:1 weight ratio solution of methanol and water are fed into the tube at a liquid flow rate of 2 ml/h, vaporized and passed through the catalyst.

11. The catalyst of claim 10 comprising 2 to 12 weight % Pd, a Pd:Zn molar ratio of 0.2 to 0.5, and a metal oxide support.

12. The catalyst of claim 10 wherein the catalyst comprises 5 to 12 weight % Pd.

13. The catalyst of claim 1 wherein the catalyst possesses an $H_2$ productivity is at least 100 $Nm^3$/kg Pd/h, as measured by a technique wherein 0.19 g of the catalyst is packed in a 4 mm inner diameter quartz tube and heated to 260° C., and a 1:1 weight ratio solution of methanol and water are fed into the tube at a liquid flow rate of 2 ml/h, vaporized and passed through the catalyst.

14. The catalyst of claim 13 wherein the catalyst comprises 5 to 12 weight % Pd.

15. The catalyst of claim 13 comprising 7 to 10 weight % Pd, a Pd:Zn molar ratio of 0.2 to 0.5, and a metal oxide support.

16. The catalyst of claim 1 wherein the catalyst possesses an $H_2$ productivity is at least 200 $Nm^3$/kg Pd/h, as measured by a technique wherein 0.19 g of the catalyst is packed in a 4 mm inner diameter quartz tube and heated to 260° C., and a 1:1 weight ratio solution of methanol and water are fed into the tube at a liquid flow rate of 2 ml/h, vaporized and passed through the catalyst.

17. The catalyst of claim 16 wherein the catalyst comprises 5 to 12 weight % Pd.

18. The catalyst of claim 16 comprising 5 to 12 weight % Pd, a Pd:Zn molar ratio of 0.1 to 0.8, and a metal oxide support.

19. The catalyst of claim 1 wherein the catalyst possesses an $H_2$ productivity is 150 to about 200 $Nm^3$/kg Pd/h, as measured by a technique wherein 0.19 g of the catalyst is packed in a 4 mm inner diameter quartz tube and heated to 260° C., and a 1:1 weight ratio solution of methanol and water are fed into the tube at a liquid flow rate of 2 ml/h, vaporized and passed through the catalyst.

20. The catalyst of claim 19 comprising 2 to 12 weight % Pd, a Pd:Zn molar ratio of 0.2 to 0.5, and a metal oxide support.

21. The catalyst of claim 1 comprising 7 to 10 weight % Pd, a Pd:Zn molar ratio of 0.25 to 0.4, and a metal oxide support.

22. The catalyst of claim 21 comprising an alumina support.

23. A method of steam reforming an alcohol comprising passing an alcohol and water in contact with the catalyst of claim 1 at a temperature of at least 200° C.

24. The method of claim 23 wherein the catalyst comprises 2 to 12 weight % Pd, a Pd:Zn molar ratio of 0.1 to 0.8, and a metal oxide support.

25. The method of claim 24 wherein the catalyst is present as a coating on a felt support.

26. The method of claim 25 wherein the catalyst is disposed in a cylindrical steam reforming chamber having an inner diameter; and wherein the catalyst has a diameter that is same as the inner diameter of the cylindrical steam reforming chamber.

27. The method of claim 24 wherein the catalyst comprises 5 to 12 weight % Pd.

* * * * *